(12) United States Patent
Sakurai et al.

(10) Patent No.: US 9,395,609 B2
(45) Date of Patent: Jul. 19, 2016

(54) PROJECTOR SUPPORTING APPARATUS

(71) Applicant: SEIKO EPSON CORPORATION, Tokyo (JP)

(72) Inventors: Shinji Sakurai, Matsumoto (JP); Genta Kawabe, Matsumoto (JP)

(73) Assignee: Seiko Espon Corporation, Tokyo (JP)

( * ) Notice: Subject to any disclaimer, the term of this patent is extended or adjusted under 35 U.S.C. 154(b) by 8 days.

(21) Appl. No.: 14/596,100

(22) Filed: Jan. 13, 2015

(65) Prior Publication Data
US 2015/0198868 A1 Jul. 16, 2015

(30) Foreign Application Priority Data

Jan. 15, 2014 (JP) .................................. 2014-004897
Jan. 15, 2014 (JP) .................................. 2014-004898

(51) Int. Cl.
*G03B 21/14* (2006.01)

(52) U.S. Cl.
CPC .................................... *G03B 21/145* (2013.01)

(58) Field of Classification Search
CPC ...... G03B 21/01; G03B 21/30; G03B 21/145; B62B 2205/10; B62B 2205/20; B62B 2205/30; B62B 2205/0006; F16M 11/00; F16M 11/04; F16M 11/22
See application file for complete search history.

(56) References Cited

U.S. PATENT DOCUMENTS

| 6,302,543 B1* | 10/2001 | Arai .................... | G03B 21/145 |
| | | | 248/157 |
| 2010/0188642 A1* | 7/2010 | Falendysz ............. | G03B 21/14 |
| | | | 353/79 |
| 2010/0214539 A1* | 8/2010 | Cheng ................... | G03B 21/28 |
| | | | 353/98 |

FOREIGN PATENT DOCUMENTS

| JP | 2000-010188 | 1/2000 |
| JP | 2000-137288 | 5/2000 |
| JP | 2001-183739 | 7/2001 |
| JP | 2002-276626 | 9/2002 |
| JP | 2009-204902 | 9/2009 |

* cited by examiner

*Primary Examiner* — Sultan Chowdhury
(74) *Attorney, Agent, or Firm* — Workman Nydegger

(57) ABSTRACT

A projector supporting apparatus includes an adjusting mechanism that adjusts the position of a projector. The adjusting mechanism includes three support portions rotatable about respective three central axes, and an adjusting portion that individually rotates the three support portions. The adjusting portion includes a first extending portion, a second extending portion, and a third extending portion respectively extending from the three support portions, and a first operating portion, a second operating portion, and a third operating portion capable of pushing and pulling the first extending portion, the second extending portion, and the third extending portion in directions intersecting the respective central axes.

16 Claims, 13 Drawing Sheets

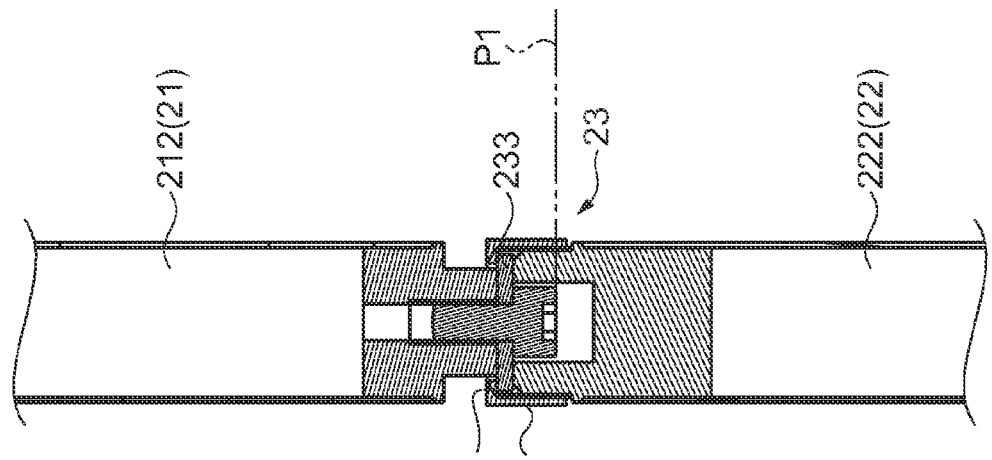
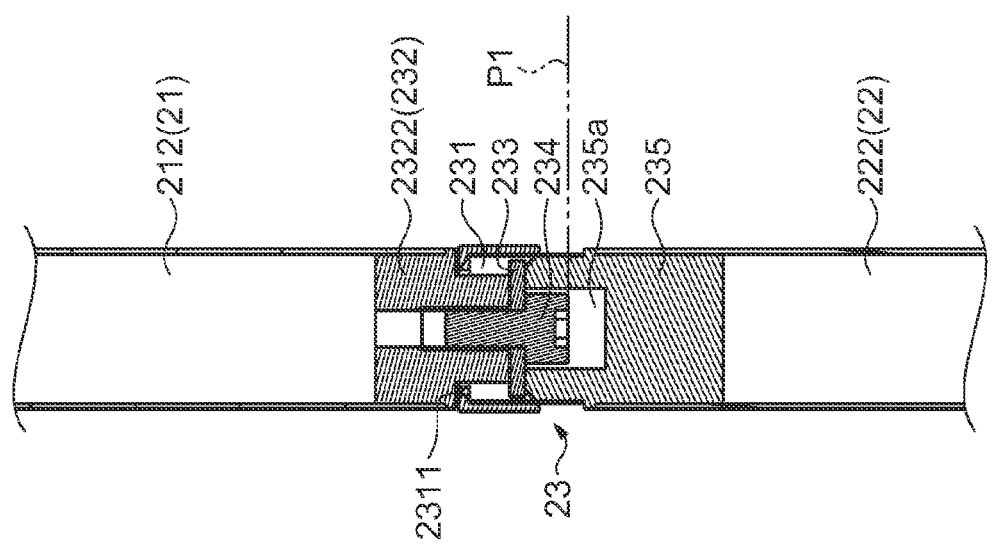
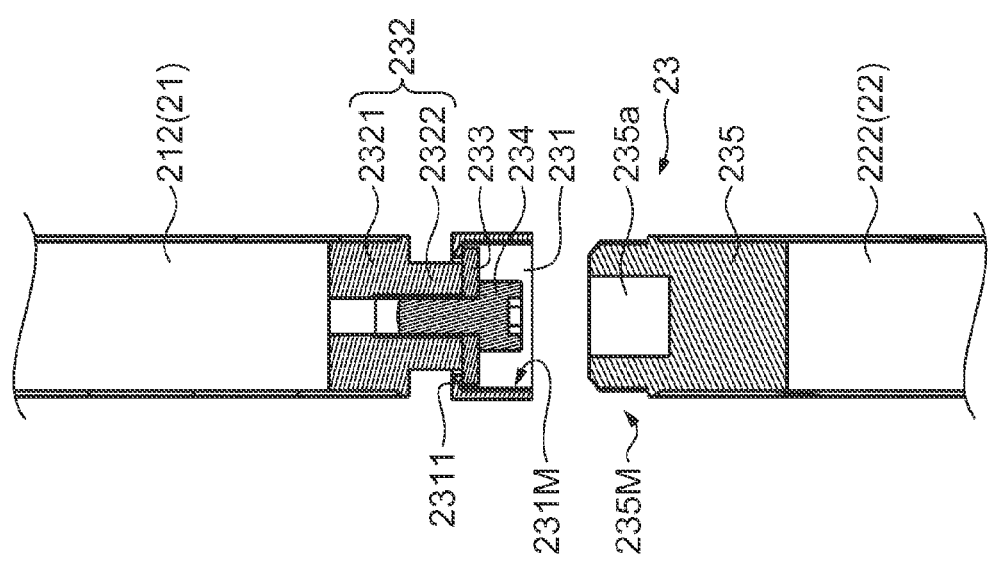

PROJECTOR SUPPORTING APPARATUS

BACKGROUND

1. Technical Field

The present invention relates to a projector supporting apparatus.

2. Related Art

In the related art, projectors that modulate light emitted from a light source in response to image information, and project the modulated light onto a projection surface such as a screen have been known. For projecting a brighter image or continuously projecting promptly an image with another projector when turning off the light source or the like, an apparatus to support a plurality of projectors such that the projectors can be arranged in a stacked manner is proposed (for example, refer to JP-A-2000-137288 (Patent Document 1)).

The apparatus (multi-stacking projecting apparatus) disclosed in Patent Document 1 is configured such that a plurality of support stands each made into a unit can be stacked via coupling shafts and spacers. The support stand includes a placing plate on which a projector is placed and an inclination adjusting mechanism. The inclination adjusting mechanism includes a support portion provided at one portion and inclination adjusting screws provided at two portions, and is configured to be able to adjust the inclination of the projector with screw adjustment at these three portions.

Patent Document 1 does not disclose a fixing method of the projector, but the placing plate is provided with a projector attaching hole, and therefore, it is considered that the projector is fixed to the placing plate by inserting a screw or the like into the projector attaching hole.

However, in the technique disclosed in Patent Document 1, the inclination adjusting mechanism is configured to adjust the screws at three portions. Therefore, in inclinations of the projector in three directions, the adjustment of inclination in one direction affects the inclinations in the other directions, which involves a problem in that it is difficult to adjust the projector at a desired inclination.

Moreover, the multi-stacking projecting apparatus disclosed in Patent Document 1 requires turning the projector upside down in work for fixing the projector to the placing plate, or arranging the placing plate and the projector at a high place to allow an assembly worker to work below the placing plate. For this reason, the projector needs to be configured so as not to be damaged even when placed upside down, or facilities for fixing work of the projector are needed. Further, the multi-stacking projecting apparatus disclosed in Patent Document 1 also requires assembling and disassembling the plurality of coupling shafts and the plurality of spacers when a plurality of projectors are arranged in a stacked manner or the plurality of projectors arranged in a stacked manner are taken from the apparatus, which also involves a problem of complicated work.

SUMMARY

An advantage of some aspects of the invention is to solve at least a part of the problems described above, and the invention can be implemented as the following forms or application examples.

APPLICATION EXAMPLE 1

This application example is directed to a projector supporting apparatus that supports a projector including a projection optical system, including: a main body frame in the interior of which the projector can be arranged; and an adjusting mechanism that couples the main body frame with the projector and adjusts the position of the projector, wherein the main body frame includes an adjusting mechanism supporting portion that supports the adjusting mechanism, the adjusting mechanism includes a base portion fixed to the adjusting mechanism supporting portion, a first support portion supported to the base portion and rotatable about a first central axis, a second support portion supported to the first support portion and rotatable about a second central axis extending in a direction orthogonal to the first central axis, a third support portion holding the projector, supported to the second support portion, and rotatable about a third central axis extending in a direction orthogonal to the first central axis and the second central axis, and an adjusting portion individually rotating the first support portion, the second support portion, and the third support portion, and the adjusting portion includes a first extending portion extending from the first support portion in a direction intersecting the first central axis, a second extending portion extending from the second support portion in a direction intersecting the first central axis, a third extending portion extending from the third support portion in a direction intersecting the first central axis, a first operating portion capable of pushing and pulling the tip side of the first extending portion in a direction intersecting the first central axis, a second operating portion capable of pushing and pulling the tip side of the second extending portion in a direction intersecting the second central axis, and a third operating portion capable of pushing and pulling the tip side of the third extending portion in a direction intersecting the third central axis.

According to the configuration, the projector is held to the third support portion and supported to the adjusting mechanism supporting portion of the main body frame via the second support portion and the first support portion. The first support portion, the second support portion, and the third support portion are configured so as to be individually rotated by the adjusting portion about the central axes respectively extending in the three directions. That is, the inclining position of the projector is changed according to the direction in which each of the support portions (the first support portion, the second support portion, and the third support portion) is rotated. With this configuration, since the inclination of the projector in three directions can be independently adjusted, it is possible to provide the projector supporting apparatus capable of easily adjusting distortion of an image projected on a projection surface.

Moreover, the adjusting portion includes the first operating portion, the second operating portion, and the third operating portion that are provided on the respective tip sides of the first extending portion, the second extending portion, and the third extending portion, and the first support portion, the second support portion, and the third support portion rotate with the pushing and pulling of the first extending portion, the second extending portion, and the third extending portion by the respective operating portions. With this configuration, even when the projector has a large size, the first operating portion, the second operating portion, and the third operating portion can be arranged in the vicinity of the outer periphery of the projector. Therefore, the operation of position adjustment can be easily carried out.

Moreover, when the projector supporting apparatus is configured to include members above and below the projector so that a plurality of projectors can be arranged in a stacked manner (stack arrangement), if the space between the upper member and the projector is narrowed so that the user cannot put a hand therebetween, the operations of the first operating portion, the second operating portion, and the third operating portion are possible. Therefore, it is possible to provide the projector supporting apparatus whose size in its thickness direction (up-and-down direction) is suppressed and which allows stack arrangement.

APPLICATION EXAMPLE 2

In the projector supporting apparatus according to the application example described above, it is preferable that the first central axis, the second central axis, and the third central axis are provided at positions shifted from a center of gravity of the projector.

When the center of gravity of the projector is located on the central axis about which the projector rotates, the balance of the projector is unstable as in a seesaw fashion in adjusting the position. Therefore, it is conceivable that the operation of the position adjustment is difficult. In a configuration with the central axis along a horizontal plane, the balance is further unstable.

According to the configuration, since the first central axis, the second central axis, and the third central axis are provided at the positions shifted from the center of gravity of the projector, the position of the projector can be adjusted in a stable state.

APPLICATION EXAMPLE 3

In the projector supporting apparatus according to the application example described above, it is preferable that in a position in which the projector supporting apparatus is installed, the first central axis extends in a direction along the vertical direction, the second central axis extends in a direction along an optical axis of the projection optical system, and the third central axis extends in a direction orthogonal to a vertical plane passing through the optical axis of the projection optical system.

According to the configuration, the first support portion, the second support portion, and the third support portion are arranged in this order from the adjusting mechanism supporting portion side in the adjusting mechanism. When the first support portion is rotated, the angle of the projector in the left-and-right direction relative to the projection surface is adjusted (horizontal rotation adjustment). When the second support portion is rotated, the angle of the projector in a direction of rotation about the optical axis of the projection optical system is adjusted (horizontal roll adjustment). When the third support portion is rotated, the angle of the projector in the up-and-down direction relative to the projection surface is adjusted (tilt adjustment).

With this configuration, the rotation range of the second support portion located between the first support portion and the third support portion is made small, so that the size of the adjusting mechanism can be reduced. Therefore, the rotation ranges in the horizontal rotation adjustment and the tilt adjustment whose frequencies of use are conceivably high are configured to be larger than the rotation range in the horizontal roll adjustment, so that it is possible to provide the projector supporting apparatus including the adjusting mechanism whose size can be reduced.

APPLICATION EXAMPLE 4

In the projector supporting apparatus according to the application example described above, it is preferable that the first extending portion extends in a first direction intersecting the first central axis, and that the second extending portion and the third extending portion extend in a second direction intersecting the first central axis and the first direction.

According to the configuration, since the first extending portion, the second extending portion, and the third extending portion extend in the directions described above, the first operating portion is arranged in the first direction orthogonal to the first central axis, and the second operating portion and the third operating portion are arranged in the second direction orthogonal to the first central axis. With this configuration, the user can adjust the position of the projector in three directions by operating the projector supporting apparatus from two directions. Therefore, work for the position adjustment of the projector in three directions can be simplified.

APPLICATION EXAMPLE 5

In the projector supporting apparatus according to the application example described above, it is preferable that the third support portion includes an opening in which at least a portion of the second support portion is arranged.

According to the configuration, since at least a portion of the second support portion is arranged in the opening of the third support portion, the adjusting mechanism can be made thinner.

APPLICATION EXAMPLE 6

In the projector supporting apparatus according to the application example described above, it is preferable that the third support portion includes a frame forming the opening, and that the frame is a tubular member having a rectangular cross-section.

According to the configuration, since the third support portion is composed of the tubular frame described above, the third support portion can be a strengthened member even with the provision of the opening. This enables the adjusting mechanism to suppress an increase in thickness and reliably hold the projector even when it is heavy.

APPLICATION EXAMPLE 7

In the projector supporting apparatus according to the application example described above, it is preferable that the first operating portion includes a first guide shaft fixed to the adjusting mechanism supporting portion, extending in a direction intersecting the first central axis, and including a screw groove, a first guide portion fixed on the tip side of the first extending portion and including an insertion hole through which the first guide shaft is inserted, and a pair of dial portions screwed with the first guide shaft and interposing the first guide portion therebetween, that the second operating portion includes a second guide shaft fixed to the first support portion, extending in a direction intersecting the second central axis, and including a screw groove, a second guide portion fixed on the tip side of the second extending portion and including an insertion hole through which the second guide shaft is inserted, and a pair of dial portions screwed with the second guide shaft and interposing the second guide portion therebetween, and that the third operating portion includes a third guide shaft fixed to the second support portion, extending in a direction intersecting the third central axis, and including a screw groove, a third guide portion fixed on the tip side of the third extending portion and including an insertion hole through which the third guide shaft is inserted, and a pair of dial portions screwed with the third guide shaft and interposing the third guide portion therebetween.

According to the configuration, the first guide shaft is fixed to the adjusting mechanism supporting portion, and the first extending portion extending from the first support portion is provided with the first guide portion. The first guide portion is interposed between the pair of dial portions screwed with the first guide shaft. With this configuration, when one of the pair of dial portions interposing the first guide portion therebetween is rotated to be separated from the first guide portion, the first guide portion can move toward the one dial portion side. Therefore, the user can push or pull the first guide portion, that is, the first extending portion according to a rotating dial portion of the pair of dial portions in the first operating portion, to thereby rotate the first support portion.

Moreover, the amount of rotation of the first support portion can be adjusted according to the amount of rotation of the dial portion. Then, by tightening the other dial portion to the first guide portion side after the rotation of the first support portion, the rotated position of the first support portion can be maintained.

Also in the second operating portion and the third operating portion, the second support portion and the third support portion can be rotated by the same operation as the first operating portion.

Therefore, with simple operations of pushing or pulling the first guide portion, the second guide portion, and the third guide portion by rotating the pair of dial portions, the inclination of the projector in three directions can be easily adjusted.

APPLICATION EXAMPLE 8

In the projector supporting apparatus according to the application example described above, it is preferable that the pair of dial portions in each of the first operating portion, the second operating portion, and the third operating portion include spherical surface portions provided on the sides facing each other and each forming a portion of a spherical surface, that each of the first operating portion, the second operating portion, and the third operating portion includes a pair of movable members each provided with an engaging portion slidably engaging with the spherical surface portion, and that the respective pairs of dial portions in the first operating portion, the second operating portion, and the third operating portion interpose the first guide portion, the second guide portion, and the third guide portion therebetween via the respective pairs of movable members.

In the first operating portion, the first guide portion is connected to the first support portion via the first extending portion, and the first guide shaft is connected to the adjusting mechanism supporting portion. Therefore, when the first support portion is rotated, the first guide portion moves relative to the first guide shaft. Therefore, in a configuration not including the movable member, torsional stress is applied to the dial portion or the first guide portion. Similarly, in the configuration not including the movable member, when the second support portion is rotated, torsional stress is applied to the dial portion or the second guide portion in the second operating portion. When the third support portion is rotated, torsional stress is applied to the dial portion or the third guide portion in the third operating portion.

According to the configuration, each of the first operating portion, the second operating portion, and the third operating portion includes the pair of movable members, and the dial portions and the movable members are configured to be slidable on the spherical surfaces as described above. Therefore, even when the first support portion, the second support portion, and the third support portion are rotated, it is possible to suppress the torsional stress applied to the dial portions or the first guide portion, the second guide portion, and the third guide portion. Therefore, it is possible to suppress the deterioration of the adjusting mechanism and smoothly rotate the first support portion, the second support portion, and the third support portion.

APPLICATION EXAMPLE 9

This application example is directed to a projector supporting apparatus that supports a projector, including: a main body frame in the interior of which the projector can be arranged; and an adjusting mechanism that couples the main body frame with the projector from above of the projector and adjusts the position of the projector, wherein the main body frame includes a first frame arranged on the upper side of the projector and supporting the adjusting mechanism, a second frame arranged on the lower side of the projector, and a coupling portion separably coupling the first frame with the second frame.

According to the configuration, the projector supporting apparatus includes the main body frame arranged on the upper side and the lower side of the projector, and the main body frame is configured to be separable into the first frame on the upper side and the second frame on the lower side. The projector is supported to the first frame via the adjusting mechanism, and the first frame is coupled to the second frame with the coupling portion. With this configuration, after attaching the projector to the first frame via the adjusting mechanism, the first frame can be coupled to the second frame. Therefore, when the projector is supported in the projector supporting apparatus, the projector can be easily arranged at a predetermined position in the projector supporting apparatus without turning the projector upside down, or without carefully arranging the projector in the projector supporting apparatus so as not to damage the projector. Similarly, also when the projector supported in the projector supporting apparatus is taken therefrom, the first frame and the second frame can be separated from each other without turning the projector upside down, and the projector can be easily taken from the projector supporting apparatus.

Moreover, compared to a projector supporting apparatus that is configured so as not to be separable, the space between the projector and the projector supporting apparatus can be made small, and therefore, the size of the projector supporting apparatus can be reduced.

Moreover, since the projector supporting apparatus can be separated into the upper and lower portions, compact storage is possible when the projector supporting apparatus is packaged for transportation or the like. Therefore, compared to a projector supporting apparatus that is configured so as not to be separable, more projector supporting apparatuses can be stored in a loadable area such as of a truck, and therefore, transport efficiency is improved.

APPLICATION EXAMPLE 10

In the projector supporting apparatus according to the application example described above, it is preferable that in a state where the projector is supported and the second frame is separated, the first frame and a member arranged in the first frame are located higher than the lower end of the projector.

According to the configuration, since the projector supporting apparatus is configured as described above, the adjusting mechanism or the first frame can be attached or detached without lifting the projector in a state where the projector is placed on a floor or the like. Therefore, the attachment or detachment of the projector relative to the projector supporting apparatus is facilitated.

APPLICATION EXAMPLE 11

In the projector supporting apparatus according to the application example described above, it is preferable that the first frame includes a first connecting portion extending toward the second frame, that the second frame includes a second connecting portion extending toward the first connecting portion, and that the coupling portion includes an engaging portion provided at the tip portion of the first connecting portion, and an engaged portion provided at the tip portion of the second connecting portion and engaged with the engaging portion.

According to the configuration, the first frame and the second frame can be coupled together by engaging the engaging portion with the engaged portion, while the first frame and the second frame can be separated from each other by releasing the engagement. Therefore, the coupling or separation of the first frame and the second frame can be easily carried out.

APPLICATION EXAMPLE 12

In the projector supporting apparatus according to the application example described above, it is preferable that the first connecting portion or a member arranged on the first connecting portion comes into surface contact with the second connecting portion or a member arranged on the second connecting portion, whereby the position of the first frame in a first direction along the extending direction of the first connecting portion is determined relative to the second frame.

When the first frame and the second frame are coupled together, the weight of the first frame, the adjusting mechanism, and the projector is applied to contact portions. According to the configuration, since the contact portions are configured so as to come into surface contact with each other, the weight of the first frame, the adjusting mechanism, and the projector can be supported by surfaces. Therefore, it is possible to provide the projector supporting apparatus capable of stably supporting the projector over a long period.

APPLICATION EXAMPLE 13

In the projector supporting apparatus according to the application example described above, it is preferable that any one of the engaging portion and the engaged portion is a movable member including a screw groove on the inner surface thereof and movable in a predetermined range in a first direction along the extending direction of the first connecting portion, and that the other of the engaging portion and the engaged portion is a fixed member including, on the outer surface thereof, a screw groove screwable with the screw groove of the movable member.

According to the configuration, the first frame and the second frame can be coupled together by rotating the movable member to screw the screw groove of the movable member with the screw groove of the fixed member, while the first frame and the second frame can be separated from each other by rotating the movable member in the opposite direction to release the screwing. This enables the projector supporting apparatus to easily carry out the coupling and separation of the first frame and the second frame without providing a projecting portion such as a lever for carrying out the coupling and separation of the first frame and the second frame. Moreover, since the main body frame can be configured without a projecting portion such as a lever, it is possible to improve the handling property of the projector supporting apparatus or make the projector supporting apparatus look more attractive.

APPLICATION EXAMPLE 14

In the projector supporting apparatus according to the application example described above, it is preferable that the projector supporting apparatus further includes a locking portion that locks the movable member at a predetermined position with movement of the movable member toward the side of the other in the first direction, and that the movable member is arranged in a loosely fitted state relative to the locking portion in a direction intersecting the first direction.

According to the configuration, since the movable member is arranged in the loosely fitted state relative to the locking portion, the screw groove of the movable member can be screwed with the screw groove of the fixed member even when the movable member and the fixed member are not accurately fitted together. Therefore, the first frame and the second frame can be easily coupled together.

APPLICATION EXAMPLE 15

In the projector supporting apparatus according to the application example described above, it is preferable that any one of the first frame or a member arranged in the first frame and the second frame or a member arranged in the second frame includes a projecting portion projecting toward the other, and that the other includes a recess into which the projecting portion is inserted when the first frame and the second frame are coupled together.

According to the configuration, when the first frame and the second frame are coupled together, the first frame and the second frame can be aligned with each other by inserting the projecting portion into the recess. Therefore, the first frame and the second frame can be easily coupled together.

APPLICATION EXAMPLE 16

In the projector supporting apparatus according to the application example described above, it is preferable that the adjusting mechanism is located higher than the lower ends of the first frame and a member arranged in the first frame.

According to the configuration, even when the first frame to which the adjusting mechanism is supported is placed on a floor or the like, the adjusting mechanism does not contact the floor or the like. Therefore, assembly work, installation work, or the like for the projector supporting apparatus can be carried out without applying a load to the adjusting mechanism.

BRIEF DESCRIPTION OF THE DRAWINGS

The invention will be described with reference to the accompanying drawings, wherein like numbers reference like elements.

FIG. 12A is a cross-sectional view showing the vicinity of a coupling portion of a main body frame according to the embodiment, showing a state where the first frame and the second frame are separated from each other.

FIG. 12B is a cross-sectional view showing the vicinity of the coupling portion of the main body frame according to the embodiment, showing a state where the first frame is placed on the second frame.

FIG. 12C is a cross-sectional view showing the vicinity of the coupling portion of the main body frame according to the embodiment, showing a state where the first frame and the second frame are coupled together.

DESCRIPTION OF EXEMPLARY EMBODIMENTS

Hereinafter, a projector supporting apparatus according to an embodiment will be described with reference to the drawings.

The projector supporting apparatus of the embodiment is configured so as to be able to support a projector in the interior thereof and adjust the position of the projector.

The projector and the projector supporting apparatus of the embodiment are configured so as to be able to assume a horizontal position in which the projector projects a landscape-oriented image onto a projection surface and a vertical position in which the projector projects a portrait-oriented image onto the projection surface.

Moreover, the projector and the projector supporting apparatus of the embodiment are configured to enable stationary installation and hanging installation in the horizontal position and the vertical position. In the stationary installation, the projector and the projector supporting apparatus are installed on an installation surface of a desk or the like, while in the hanging installation, the projector and the projector supporting apparatus hang from a ceiling or the like. Moreover, the projector and the projector supporting apparatus of the embodiment are configured such that the top and bottom orientation of the projector is the same in the stationary installation and the hanging installation in each of the horizontal position and the vertical position.

Moreover, the projector supporting apparatus of the embodiment is configured such that a plurality of the projector supporting apparatuses can be stacked, in which a plurality of projectors can be arranged in a stacked state.

Figure 1:
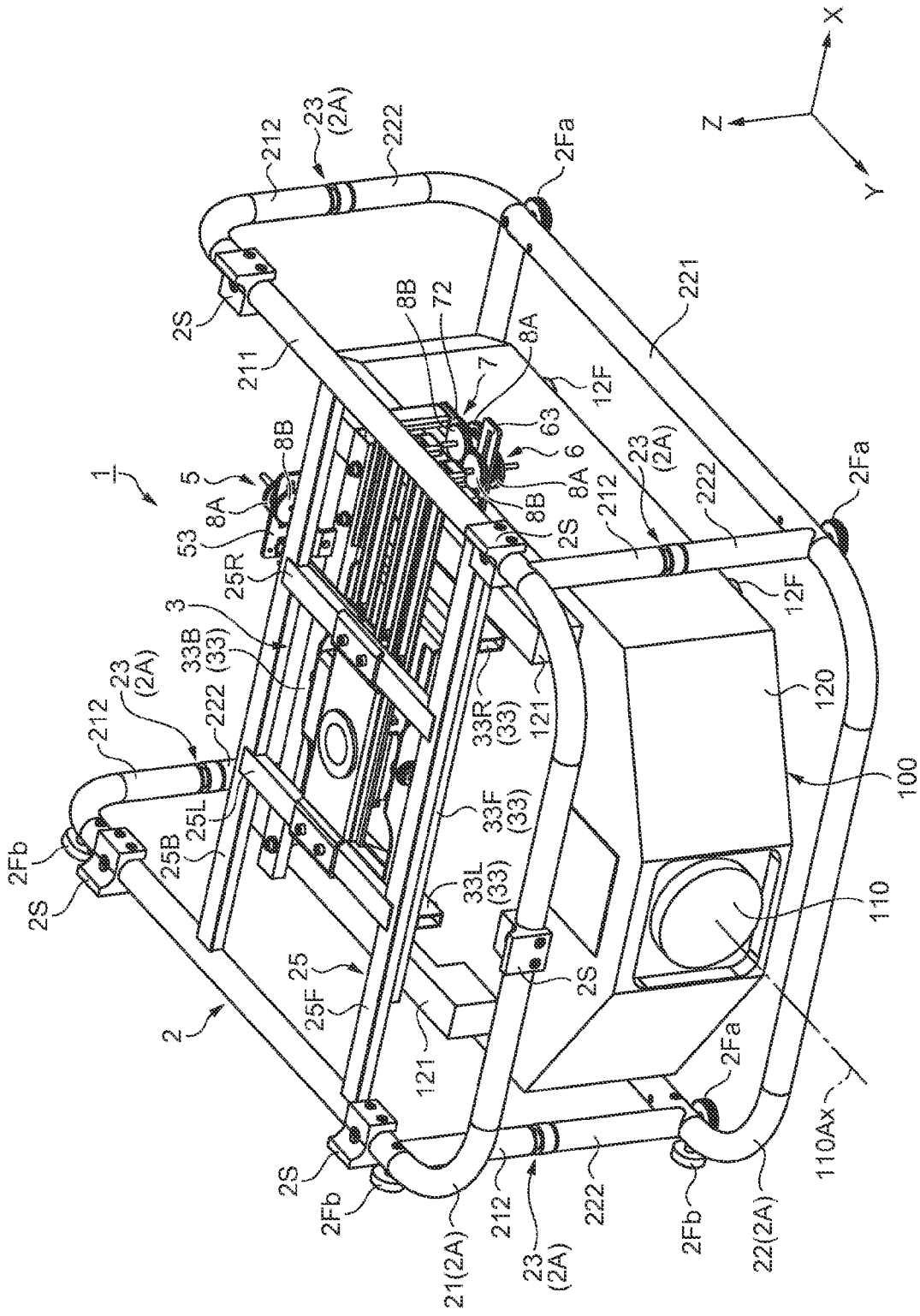
FIG. 1 is a perspective view showing a projector supporting apparatus and a projector supported in the projector supporting apparatus according to an embodiment.

FIG. 1 is a perspective view showing a projector supporting apparatus 1 in the horizontal position and a projector 100 supported in the projector supporting apparatus 1.

Although not described in detail, the projector 100 includes a light source, a light modulator that modulates light emitted from the light source, and as shown in FIG. 1, a projection lens 110 as a projection optical system that projects the modulated light, and an outer casing 120 that accommodates these constituting members. The projector 100 modulates the light emitted from the light source in response to image information, and enlarges and projects the modulated light onto a projection surface such as a screen. In the following, a direction of the light emitted from the projector 100 in the horizontal installation is referred to as front (positive Y-direction), a direction opposite to the gravity is referred to as up (positive Z-direction), and the right side as viewed from the projection surface side is referred to as right (positive X-direction), for convenience of description.

The outer casing 120 is composed of a plurality of members, an upper case forming an upper portion and a lower case forming a lower portion.

As shown in FIG. 1, an opening is formed at the central portion in the front surface of the outer casing 120. The tip of the projection lens 110 is exposed through the opening.

The upper case of the outer casing 120 is provided with a pair of handles 121.

The pair of handles 121 are portions that are gripped by a user when carrying the projector 100. The pair of handles 121 are substantially parallel to each other and extend along the front-and-back direction. An empty space through which the user's fingers are insertable is provided at the central portion of each of the handles between the handle and the upper surface of the upper case.

Moreover, the outer casing 120 is provided with leg portions 12F on the lower surface thereof. The leg portions 12F support the projector 100 when the projector 100 alone is placed on a desk or the like without using the projector supporting apparatus 1.

Configuration of Projector Supporting Apparatus

As shown in FIG. 1, the projector supporting apparatus 1 includes a support main body portion 2 including a main body frame 2A, and an adjusting mechanism 3 that couples the main body frame 2A with the projector 100 and adjusts the position of the projector 100.

The support main body portion 2 includes, in addition to the main body frame 2A, first leg portions 2Fa, second leg portions 2Fb, and joining portions for stacking 2S.

The main body frame 2A is configured such that the projector 100 can be arranged in the interior thereof, and has a function of protecting the projector 100 and a function of supporting the projector 100 via the adjusting mechanism 3.

The main body frame 2A includes a first frame 21 arranged on the upper side of the projector 100, a second frame 22 arranged on the lower side of the projector 100, and coupling portions 23 that separably couple the first frame 21 with the second frame 22.

Figure 2:
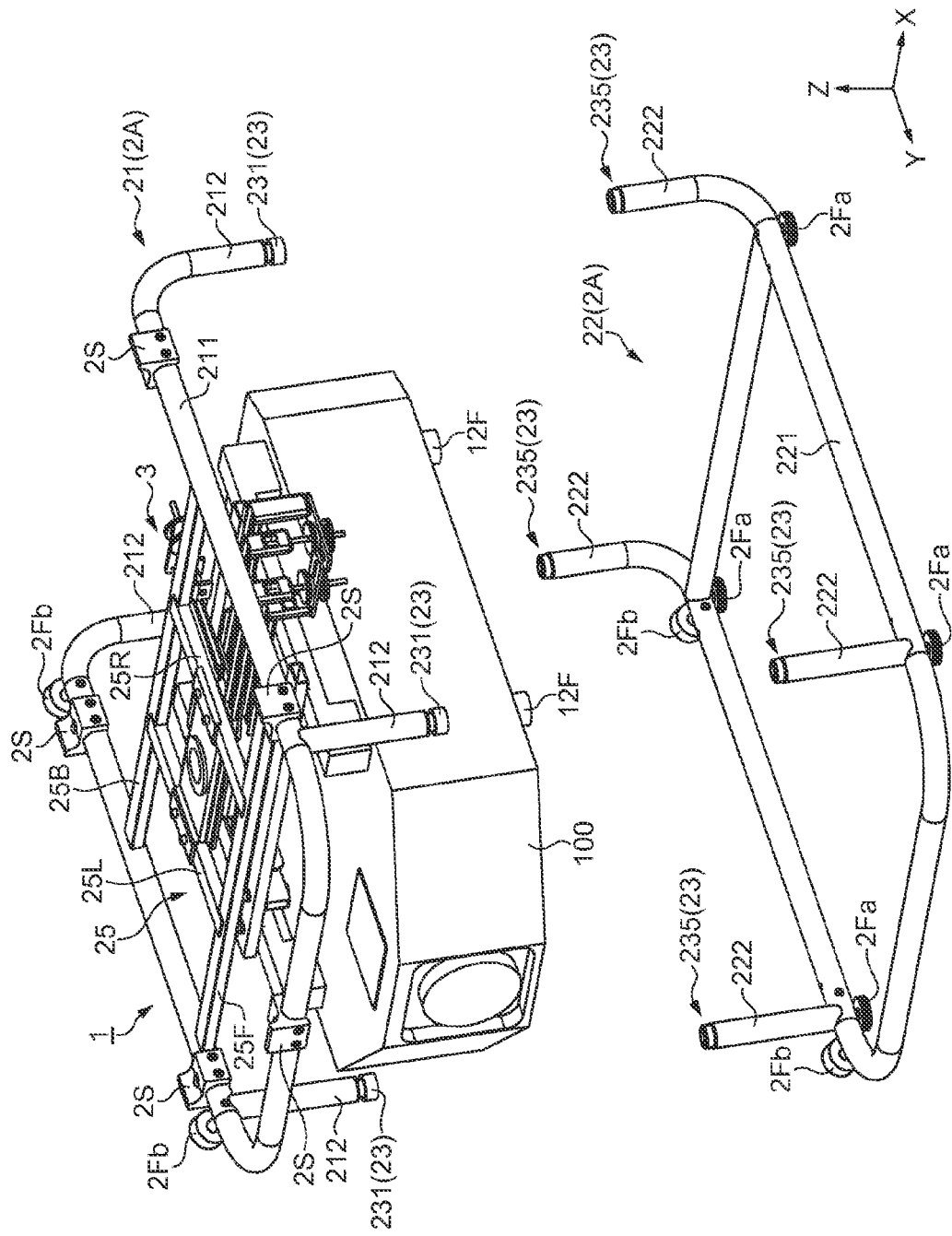
FIG. 2 is a perspective view showing the projector supporting apparatus according to the embodiment in which a first frame and a second frame are separated from each other.

FIG. 2 is a perspective view showing the projector supporting apparatus 1 in which the first frame 21 and the second frame 22 are separated from each other.

As shown in FIG. 2, the first frame 21 includes an upper frame 211, first connecting portions 212, and an adjusting mechanism supporting portion 25.

The upper frame 211 is formed of a pipe-shaped member, and formed so as to be arranged, above the projector 100, at a position in front of the projector 100 and positions on the left and right sides of the projector 100. That is, the upper frame 211 is formed so as not to be arranged at a position on the back of the projector 100 above the projector 100.

The first connecting portions 212, the number of which is four, are pipe-shaped members and extend from the vicinity of four corners of the upper frame 211 toward the second frame 22 side.

As shown in FIG. 2, in the four first connecting portions 212, two back first connecting portions 212 are bent downward from the upper frame 211, while two front first connecting portions 212 are fixed at the base end side to the upper frame 211 by welding or the like.

The adjusting mechanism supporting portion 25 has a function of supporting the adjusting mechanism 3, and is composed of, as shown in FIG. 2, four columnar portions 25F, 25B, 25L, and 25R combined together by welding or the like. Each of the columnar portions 25F, 25B, 25L, and 25R is a tubular member having a rectangular cross-section and extending along a straight line. Specifically, the adjusting mechanism supporting portion 25 is configured such that the columnar portion 25F located on the front side and the columnar portion 25B located on the back side are bridged between the left and right portions of the upper frame 211, and that the columnar portion 25R located on the right side and the columnar portion 25L located on the left side are bridged between the columnar portions 25F and 25B. The cross-sectional shape of the columnar portions 25F, 25B, 25L, and 25R is not limited to be rectangular but may be circular.

The second frame 22 is formed of a pipe-shaped member, and includes, as shown in FIG. 2, a lower frame 221 and second connecting portions 222.

The lower frame 221 is arranged in a rectangular shape in a plan view below the projector 100 at positions to the front, back, left, and right of the projector 100.

The second connecting portions 222, the number of which is four and which are provided corresponding to the four first connecting portions 212, extend from the lower frame 221 toward the first connecting portions 212.

As shown in FIG. 2, in the four second connecting portions 222, two back second connecting portions 222 are bent upward from the lower frame 221, while two front second connecting portions 222 are fixed at the base end side to the lower frame 221 by welding or the like.

Although described in detail later, each of the coupling portions 23 includes an engaging portion provided at the tip portion of the first connecting portion 212, and an engaged portion provided at the tip portion of the second connecting portion 222 and engaging with the engaging portion. The coupling portions 23 separably couple the first frame 21 with the second frame 22.

As shown in FIG. 2, the first leg portions 2Fa are arranged so as to project downward from four corners of the lower frame 221, and support the projector supporting apparatus 1 when the projector supporting apparatus 1 is installed in the horizontal position on a desk or the like.

As shown in FIG. 2, the second leg portions 2Fb are arranged such that two second leg portions 2Fb are arranged at left-side (negative X-side) portions of each of the upper frame 211 and the lower frame 221. The projector supporting apparatus 1 is configured to be able to be placed on a desk or the like in a position with the left side (negative X-side) of the projector supporting apparatus 1 facing down. In this position, the second leg portions 2Fb support the projector supporting apparatus 1.

As shown in FIG. 2, the joining portions for stacking 2S are arranged in the vicinity of the four corners of the upper frame 211. The joining portions for stacking 2S connect upper and lower projector supporting apparatuses 1 so that a plurality of projector supporting apparatuses 1 can be vertically arranged in a stacked manner in the horizontal position (position in which the projector projects a landscape-oriented image).

The adjusting mechanism 3 couples the first frame 21 with the projector 100 from above of the projector 100, and is configured to be able to adjust the position of the projector 100. Specifically, the adjusting mechanism 3 is configured to be able to adjust a direction of rotation about an axis (a first central axis 10Ax described later, refer to FIG. 4) extending in the Z-direction (horizontal rotation adjustment), adjust a direction of rotation about an axis (a second central axis 20Ax described later, refer to FIG. 4) extending in the Y-direction (horizontal roll adjustment), and adjust a direction of rotation about an axis (a third central axis 30Ax described later, refer to FIG. 4) extending in the X-direction (tilt adjustment).

Configuration of Adjusting Mechanism

Here, the adjusting mechanism 3 will be described in detail.

Figure 3A:
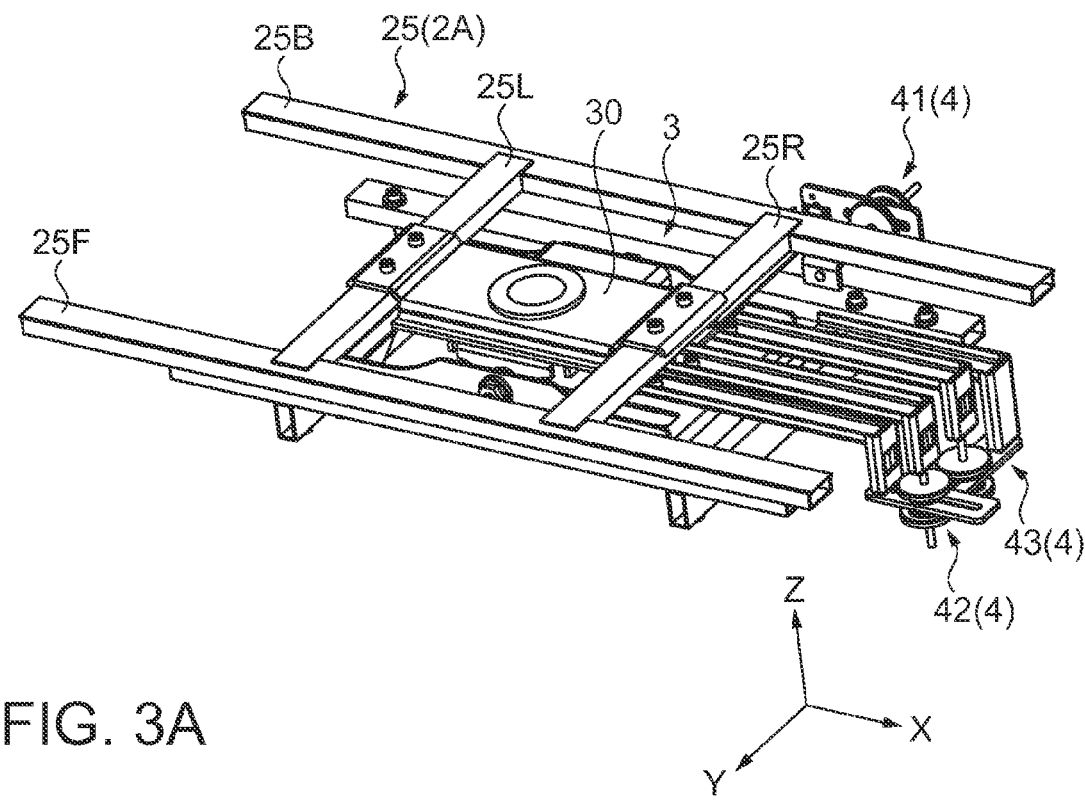
FIG. 3A is a front perspective view of an adjusting mechanism and an adjusting mechanism supporting portion according to the embodiment.
Figure 3B:
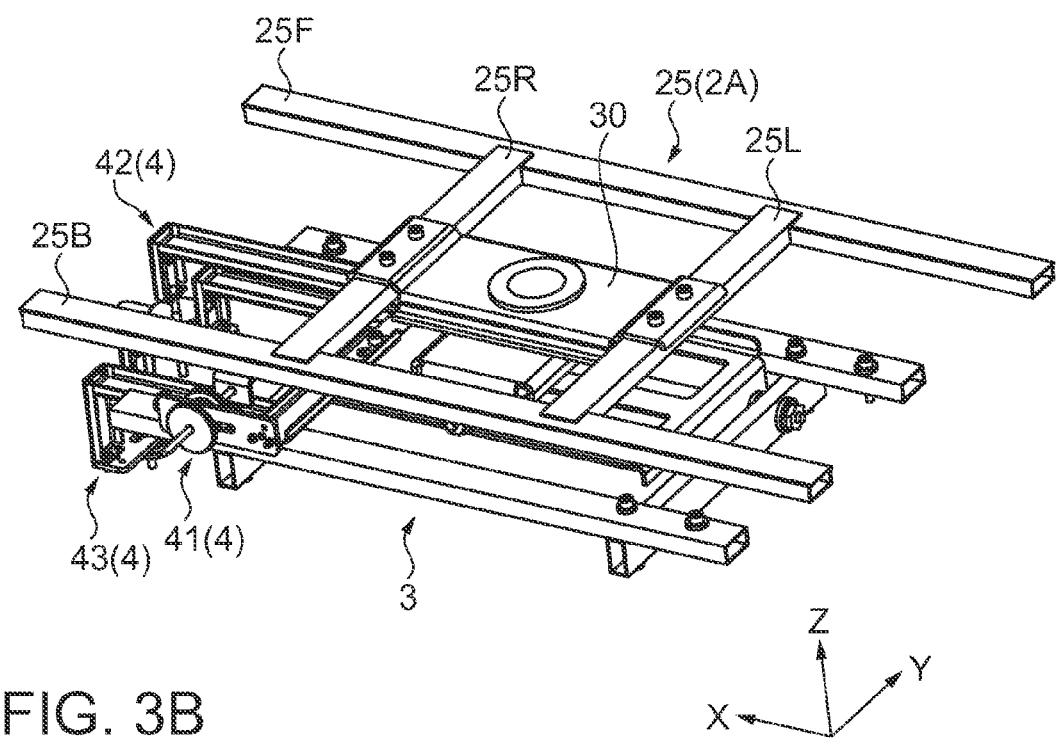
FIG. 3B is a rear perspective view of the adjusting mechanism and the adjusting mechanism supporting portion according to the embodiment.
Figure 4:
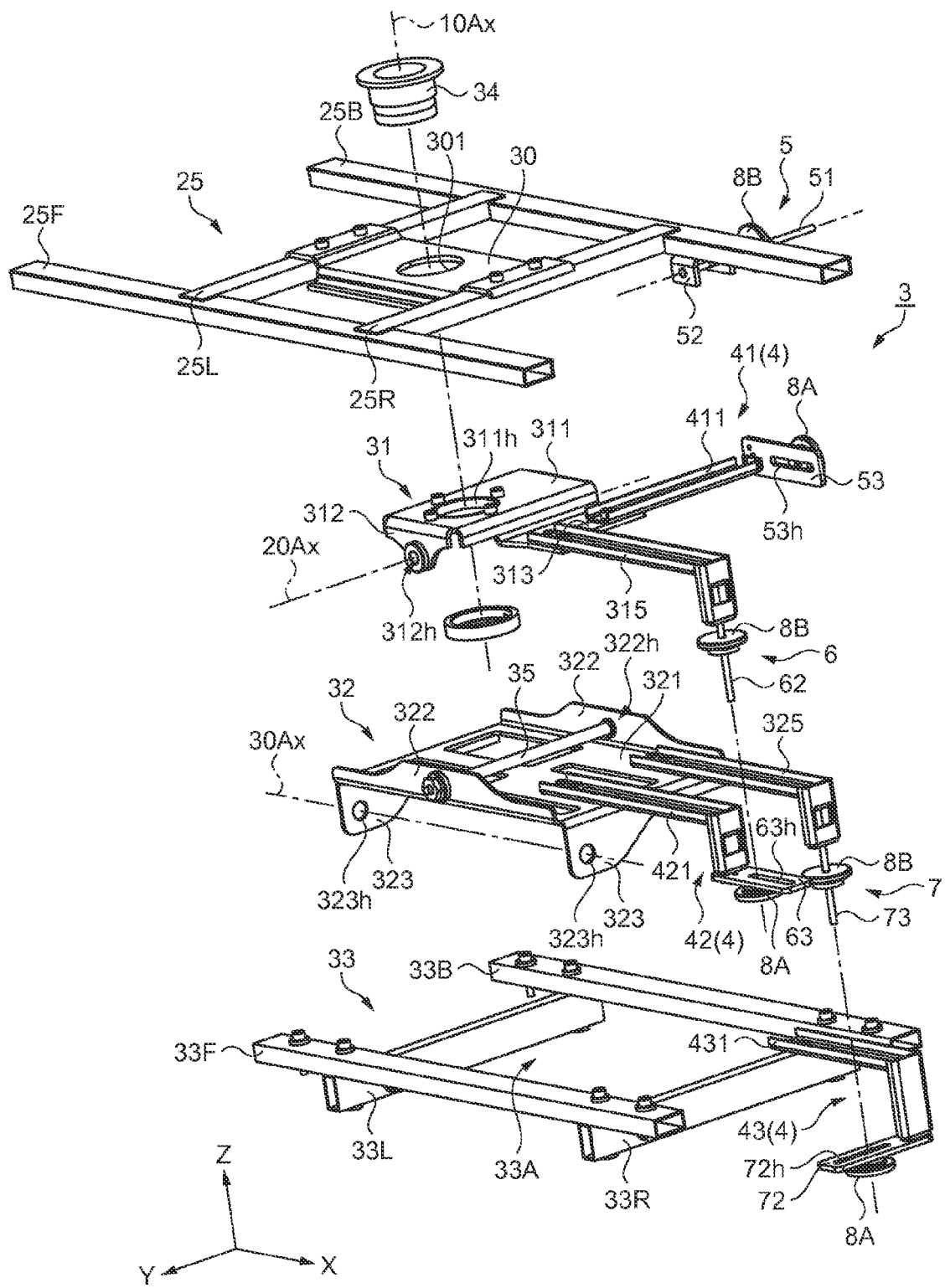
FIG. 4 is an exploded perspective view of the adjusting mechanism according to the embodiment, showing a front perspective view.
Figure 5:
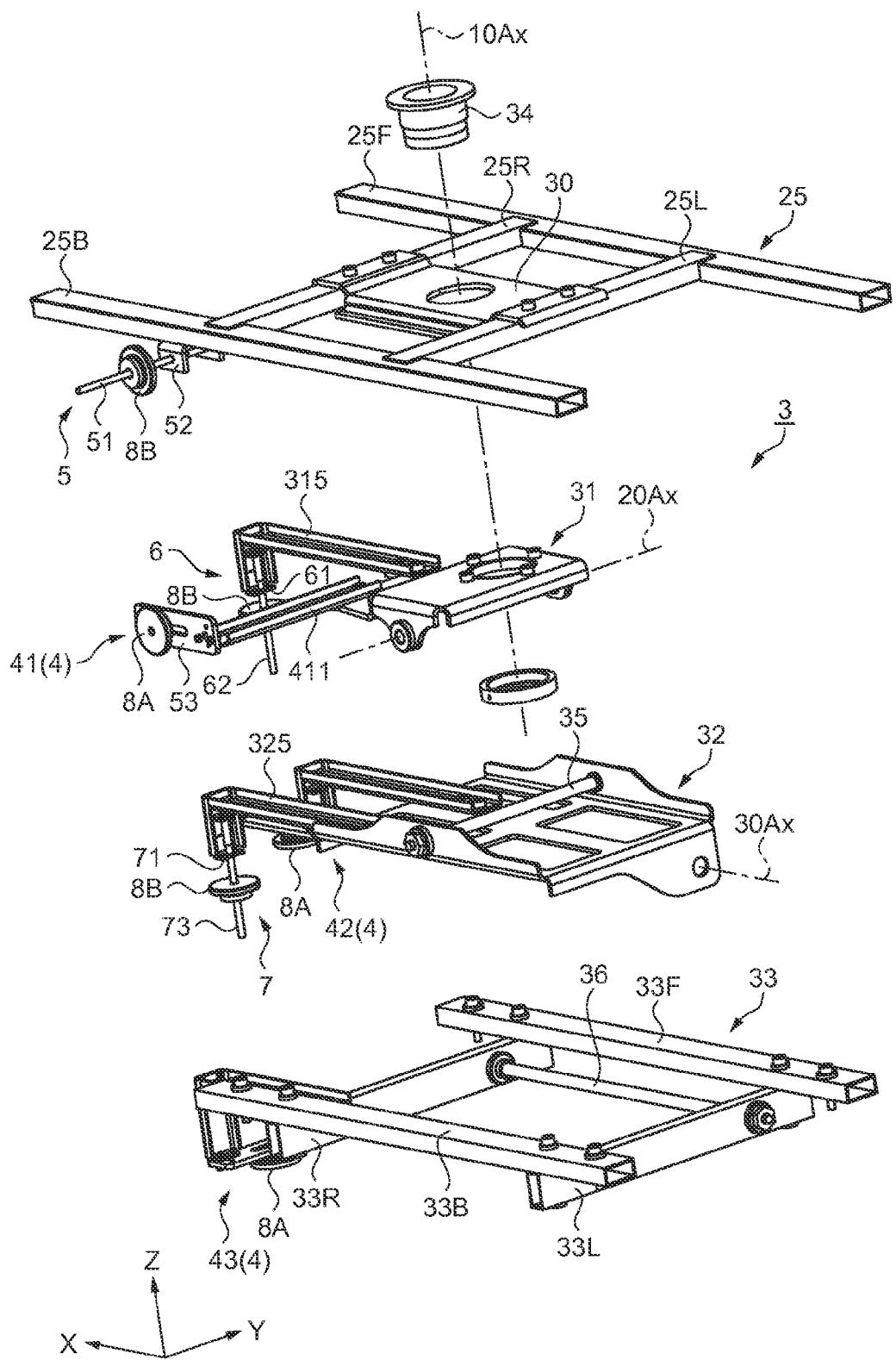
FIG. 5 is an exploded perspective view of the adjusting mechanism according to the embodiment, showing a rear perspective view.

FIGS. 3A and 3B are perspective views showing the adjusting mechanism 3 and the adjusting mechanism supporting portion 25 in the main body frame 2A, in which FIG. 3A is a front perspective view, and FIG. 3B is a rear perspective view. FIG. 4 is an exploded perspective view of the adjusting mechanism 3, showing a front perspective view. FIG. 5 is an exploded perspective view of the adjusting mechanism 3, showing a rear perspective view.

As shown in FIG. 5, the adjusting mechanism 3 includes a base portion 30, a first support portion 31, a second support portion 32, a third support portion 33, support shafts 34, 35, and 36, and an adjusting portion 4.

The base portion 30 is formed of sheet metal and fixed at the left and right sides to the columnar portions 25R and 25L of the adjusting mechanism supporting portion 25 as shown in FIGS. 3A and 3B. As shown in FIG. 4, a round hole 301 about the first central axis 10Ax extending in the up-and-down direction (vertical direction) is formed in the base portion 30.

The first support portion 31 is formed of sheet metal and arranged below the base portion 30. As shown in FIG. 4, the first support portion 31 includes an upper surface portion 311, a pair of side surface portions 312 bent downward from the front and back sides of the upper surface portion 311, and an attaching portion 313 bent downward from the right side of the upper surface portion 311 and then extending rightward. The attaching portion 313 is provided with a projecting member 315.

The projecting member 315 is made of sheet metal and includes a member extending rightward from the attaching portion 313 and a member fixed to the tip portion of the above-described member and extending downward. In each of these members, both sides thereof along the extending direction of the member are bent to increase its strength.

A round hole 311h about the first central axis 10Ax is formed in the upper surface portion 311. A round hole 312h about the second central axis 20Ax extending in the front-and-back direction is formed in each of the pair of side surface portions 312.

The support shaft 34 is inserted through the round hole 301 of the base portion 30 and the round hole 311h of the first support portion 31. The first support portion 31 is supported to the base portion 30 and rotatable about the first central axis 10Ax.

The second support portion 32 is formed of sheet metal and arranged below the first support portion 31. As shown in FIG. 4, the second support portion 32 includes an upper surface portion 321, a pair of side surface portions 322 bent upward from the front and back sides of the upper surface portion 321, and a pair of side surface portions 323 bent downward from the left and right sides of the upper surface portion 321.

The upper surface portion 321 is provided with a projecting member 325.

The projecting member 325 is made of sheet metal and includes a member extending rightward from the upper surface portion 321 and a member fixed at the tip portion of the above-described member and extending downward. In each of these members, both sides thereof along the extending direction of the member are bent to increase its strength.

The pair of side surface portions 322 are spaced apart from each other to allow the pair of side surface portions 312 of the first support portion 31 to be inserted therebetween. A round hole 322h about a central axis that is coaxial with the second central axis 20Ax is formed in each of the pair of side surface portions 322. A round hole 323h about the third central axis 30Ax extending in the left-and-right direction is formed in each of the pair of side surface portions 323. The third central axis 30Ax extends in a direction orthogonal to a vertical plane passing through an optical axis 110Ax of the projection lens 110.

The support shaft 35 is inserted through the round hole 312h of the first support portion 31 and the round hole 322h of the second support portion 32. The second support portion 32 is supported to the first support portion 31 and rotatable about the second central axis 20Ax.

As shown in FIG. 4, the third support portion 33 is arranged below the second support portion 32. The third support portion 33 is composed of four tubular frames 33F, 33B, 33L, and 33R combined together. Each of the frames 33F, 33B, 33L, and 33R has a rectangular cross-section and extends along a straight line. Specifically, the frames 33F, 33B, 33L, and 33R are arranged respectively on the front, back, left, and right sides so that an opening 33A is provided at the center of the third support portion 33, and are assembled by screws, welding, or the like. The cross-sectional shape of the frames 33F, 33B, 33L, and 33R is not limited to be rectangular but may be circular.

The frames 33F, 33B, 33L, and 33R are combined together so as to have a size allowing a lower portion of the second support portion 32 to be arranged within the opening 33A, and such that the left and right ends of each of the frames 33F and 33B project from the frames 33R and 33L.

As shown in FIG. 1, the tip portions of the frames 33F and 33B projecting from the frames 33R and 33L are screw fixed to the pair of handles 121 of the projector 100, so that the third support portion 33 holds the projector 100.

A round hole about a central axis that is coaxial with the third central axis 30Ax is formed in each of the frames 33R and 33L. Through the round holes and the round holes 323h of the second support portion 32, the support shaft 36 (refer to FIG. 5) is inserted. The third support portion 33 is supported relative to the second support portion 32 and rotatable about the third central axis 30Ax.

Next, the adjusting portion 4 will be described.

The adjusting portion 4 has a function of individually rotating the first support portion 31, the second support portion 32, and the third support portion 33.

Figure 6A:
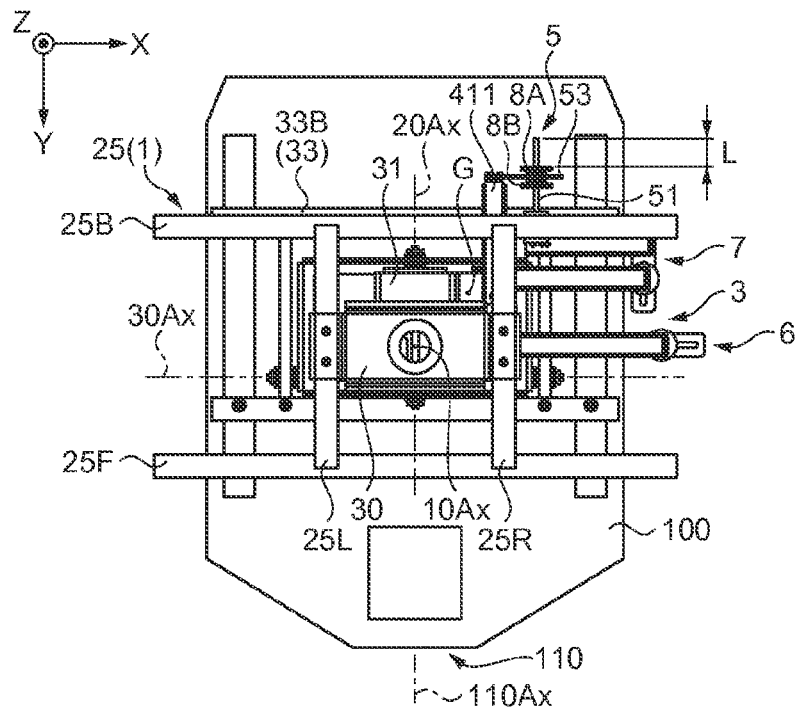
FIG. 6A is a top plan view of the projector, the adjusting mechanism supporting portion, and the adjusting mechanism according to the embodiment.
Figure 6B:
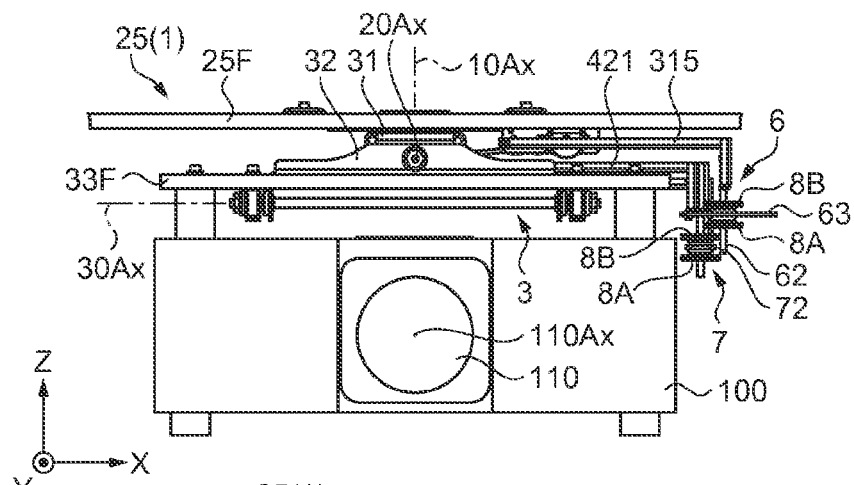
FIG. 6B is a front plan view of the projector, the adjusting mechanism supporting portion, and the adjusting mechanism according to the embodiment.
Figure 6C:
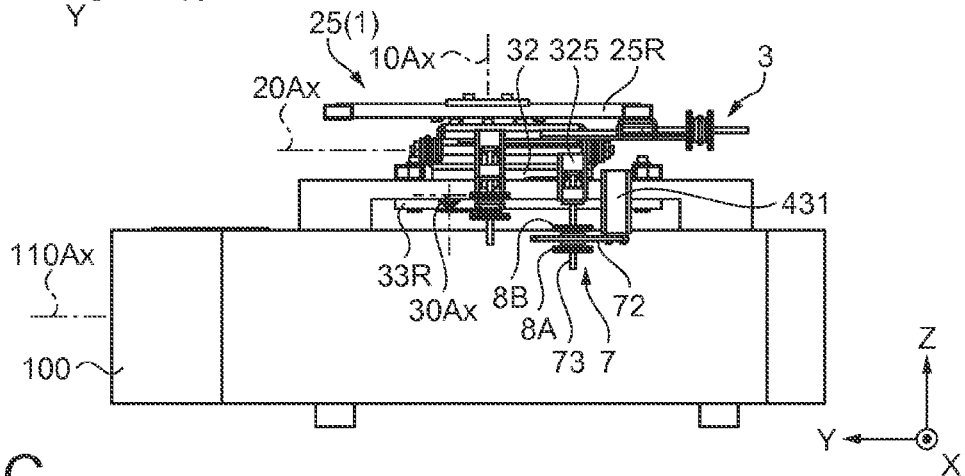
FIG. 6C is a right side plan view of the projector, the adjusting mechanism supporting portion, and the adjusting mechanism according to the embodiment.

FIGS. 6A to 6C are plan views showing the projector 100 in the horizontal position, and the adjusting mechanism supporting portion 25 and the adjusting mechanism 3 in the projector supporting apparatus 1. Specifically, FIG. 6A is a top view of the projector 100, FIG. 6B is a front view of the projector 100, and FIG. 6C is a right side view of the projector 100.

As shown in FIG. 6A, the projector 100 is supported in the projector supporting apparatus 1 such that a first reference state where the optical axis 110Ax of the projection lens 110 is substantially parallel to the second central axis 20Ax can be brought about. In the projector 100, the second central axis 20Ax forms a substantially right angle with the columnar portion 25F of the adjusting mechanism supporting portion 25 as viewed from above in the first reference state. Moreover, as shown in FIG. 6B, the projector 100 is supported in the projector supporting apparatus 1 such that a second reference state where the third central axis 30Ax is substantially parallel to the columnar portion 25F as viewed from the front can be brought about, and as shown in FIG. 6C, the projector 100 is supported in the projector supporting apparatus 1 such that a third reference state where the frame 33R of the third support portion 33 is substantially parallel to the columnar portion 25R as viewed from the right side can be brought about.

The adjusting portion 4 individually rotates the first support portion 31, the second support portion 32, and the third support portion 33, whereby the inclined angle of the projector 100 is adjusted in each direction with respect to the three reference states described above.

As shown in FIG. 6A, the first central axis 10Ax is located substantially at the center of the four columnar portions 25F, 25B, 25R, and 25L, and the second central axis 20Ax is located substantially at the center between the columnar portion 25R and the columnar portion 25L, as viewed from above. The third central axis 30Ax is located closer to the columnar portion 25F between the columnar portion 25F and the columnar portion 25B as viewed from above.

Moreover, as shown in FIG. 6A, a center of gravity G of the projector 100 is located to the right of the second central axis 20Ax and to the back of the third central axis 30Ax as viewed from above. That is, the first central axis 10Ax, the second central axis 20Ax, and the third central axis 30Ax are provided at positions shifted from the center of gravity G of the projector 100.

Returning to FIG. 4, the adjusting portion 4 includes a first adjusting portion 41, a second adjusting portion 42, and a third adjusting portion 43.

As shown in FIG. 4, the first adjusting portion 41 includes a first extending portion 411 and a first operating portion 5, and rotates the first support portion 31 about the first central axis 10Ax relative to the base portion 30.

The first extending portion 411 is fixed to the attaching portion 313 of the first support portion 31, and extends in a first direction intersecting the first central axis 10Ax, specifically, extends rearward (negative Y-direction). The first extending portion 411 is made of sheet metal, and both sides thereof along the first direction are bent to increase its strength.

Figure 7:
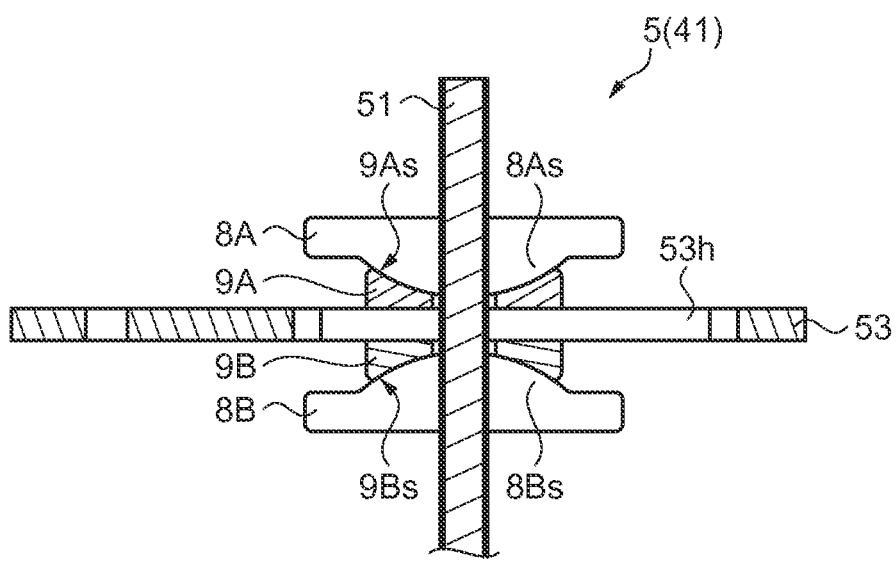
FIG. 7 is a cross-sectional view showing a portion of a first operating portion in a first reference state according to the embodiment.

FIG. 7 is a cross-sectional view showing a portion of the first operating portion 5 in the first reference state.

As shown in FIGS. 4 and 7, the first operating portion 5 includes a first guide portion 53, a first guide shaft 51, a shaft supporting portion 52 that supports the first guide shaft 51, a pair of dial portions 8A and 8B, and a pair of movable members 9A and 9B.

The first guide portion 53 is made of sheet metal and attached to the tip of the first extending portion 411. A track-shaped insertion hole 53h whose size is larger in the left-and-right direction than in the up-and-down direction is formed in the first guide portion 53.

The shaft supporting portion 52 is made of sheet metal and formed by bending the sheet metal. As shown in FIG. 5, the shaft supporting portion 52 is attached below the columnar portion 25B in the vicinity of the columnar portion 25R.

The first guide shaft 51 has a screw groove. One end side of the first guide shaft 51 is fixed to the shaft supporting portion 52, that is, to the adjusting mechanism supporting portion 25, while the other end side is inserted through the insertion hole 53h of the first guide portion 53. The first guide shaft 51 is arranged so as to extend in a direction interesting the first central axis 10Ax, specifically, in the front-and-back direction.

Each of the dial portions 8A and 8B is provided with a hole in the center. On the inner surface of the hole, a screw groove that is screwed with the screw groove of the first guide shaft 51 is formed. The dial portions 8A and 8B are arranged so as to interpose the first guide portion 53 therebetween via the pair of movable members 9A and 9B as shown in FIG. 7. That is, the movable member 9A is arranged between the dial portion 8A and the first guide portion 53, while the movable member 9B is arranged between the dial portion 8B and the first guide portion 53.

Moreover, the dial portions 8A and 8B respectively include convex spherical surface portions 8As and 8Bs provided on the sides facing each other and each forming a portion of a spherical surface.

A hole through which the first guide shaft 51 is inserted is formed in the center of each of the movable members 9A and 9B. The movable members 9A and 9B are formed to be flat on the first guide portion 53 side, and concave engaging portions 9As and 9Bs that slidably engage with the spherical surface portions 8As and 8Bs of the dial portions 8A and 8B, respectively, are formed on the dial portions 8A and 8B sides.

In the first reference state, the first guide shaft is inserted through substantially the center of the insertion hole 53h so as to form a substantially right angle with the first guide portion 53 as shown in FIG. 7, so that the movable members 9A and 9B are arranged so as to face each other via the first guide portion 53. The dial portions 8A and 8B are arranged so as to face each other via the movable members 9A and 9B and the first guide portion 53.

Moreover, the dial portions 8A and 8B and the first guide portion 53 of the first operating portion 5 are arranged above the projector 100 and spaced apart from the upper frame 211 as shown in FIG. 1. That is, the dial portions 8A and 8B and the first guide portion 53 of the first operating portion 5 are arranged above the projector 100 at a portion at which a user can easily operate them from a position to the back of the projector 100 where the upper frame 211 is not provided.

Although described in detail later, with the rotation of the dial portions 8A and 8B of the first operating portion 5, the first guide portion 53 is released from a state of being interposed between the pair of movable members 9A and 9B. Then, the movement of the first guide portion 53, that is, the pushing or pulling of the first extending portion 411 is made possible, and the first support portion 31 connected to the first extending portion 411 is pushed or pulled at a portion thereof distant from the first central axis 10Ax, thereby rotating about the first central axis 10Ax.

As shown in FIG. 4, the second adjusting portion 42 includes a second extending portion 421 and a second operating portion 6, and rotates the second support portion 32 about the second central axis 20Ax relative to the first support portion 31.

The second extending portion 421 is attached to the upper surface portion 321 of the second support portion 32, and provided so as to be located below the projecting member 315. The second extending portion 421 is made of sheet metal and includes a member extending in a second direction intersecting a direction along the first central axis 10Ax and the first direction, specifically, extending rightward (positive X-direction), and a member fixed to the tip portion of the above-described member and extending downward. In each of the members, both sides thereof along the extending direction of the member are bent to increase its strength.

As shown in FIG. 1, the second operating portion 6 is provided on the side opposite to the side where the second leg portions 2Fb are arranged. As shown in FIG. 4, the second operating portion 6 includes a second guide portion 63, a second guide shaft 62, a shaft supporting portion 61 (refer to FIG. 5) that supports the second guide shaft 62, and a pair of dial portions 8A and 8B and a pair of movable members 9A and 9B (not shown) similarly to the first operating portion 5.

As shown in FIG. 4, the second guide portion 63 is made of sheet metal and attached to the tip of the second extending portion 421, that is, the tip of the member extending downward in the second extending portion 421. A track-shaped insertion hole 63h whose size is larger in the left-and-right direction than in the front-and-back direction is formed in the second guide portion 63.

As shown in FIG. 5, the shaft supporting portion 61 is attached to the member extending downward in the projecting member 315.

The second guide shaft 62 has a screw groove. One end side of the second guide shaft 62 is fixed to the first support portion 31 via the shaft supporting portion 61, that is, the shaft supporting portion 61 and the projecting member 315, while the other end side is inserted through the insertion hole 63h of the second guide portion 63. Then, the second guide shaft 62 is arranged so as to extend in a direction (the up-and-down direction) intersecting the second central axis 20Ax.

Similarly to the dial portions 8A and 8B of the first operating portion 5, the dial portions 8A and 8B of the second operating portion 6 are configured so as to interpose the second guide portion 63 therebetween via the movable members 9A and 9B. Moreover, the dial portions 8A and 8B and the second guide portion 63 of the second operating portion 6 are spaced apart from the main body frame 2A as shown in FIG. 1, and arranged to the right of the projector 100 as shown in FIG. 6B.

Although described in detail later, with the rotation of the dial portions 8A and 8B of the second operating portion 6, the second guide portion 63 is released from a state of being interposed between the pair of movable members 9A and 9B.

Then, the movement of the second guide portion 63, that is, the pushing or pulling of the second extending portion 421 is made possible, and the second support portion 32 connected to the second extending portion 421 is pushed or pulled at a portion thereof distant from the second central axis 20Ax, thereby rotating about the second central axis 20Ax.

As shown in FIG. 4, the third adjusting portion 43 includes a third extending portion 431 and a third operating portion 7, and rotates the third support portion 33 about the third central axis 30Ax relative to the second support portion 32.

The third extending portion 431 is attached to the frame 33R of the third support portion 33, and provided so as to be located below the projecting member 325. The third extending portion 431 is made of sheet metal and includes, similarly to the second extending portion 421, a member extending in the second direction intersecting the first central axis 10Ax, and a member fixed to the tip portion of the above-described member and extending downward. In each of the members, both sides thereof along the extending direction of the member are bent to increase its strength.

As shown in FIG. 1, the third operating portion 7 is provided on the side opposite to the side where the second leg portions 2Fb are arranged, similarly to the second operating portion 6. As shown in FIG. 4, the third operating portion 7 includes a third guide portion 72, a third guide shaft 73, a shaft supporting portion 71 (refer to FIG. 5) that supports the third guide shaft 73, and a pair of dial portions 8A and 8B and a pair of movable members 9A and 9B (not shown) similarly to the first operating portion 5.

As shown in FIG. 4, the third guide portion 72 is made of sheet metal and attached to the tip of the third extending portion 431, that is, the tip of the member extending downward in the third extending portion 431. A track-shaped insertion hole 72h whose size is larger in the front-and-back direction than in the left-and-right direction is formed in the third guide portion 72.

As shown in FIG. 5, the shaft supporting portion 71 is attached to the member extending downward in the projecting member 325.

The third guide shaft 73 has a screw groove. One end side of the third guide shaft 73 is fixed to the second support portion 32 via the shaft supporting portion 71, that is, the shaft supporting portion 71 and the projecting member 325, while the other end side is inserted through the insertion hole 72h of the third guide portion 72. Then, the third guide shaft 73 is arranged so as to extend in a direction (the up-and-down direction) intersecting the third central axis 30Ax.

Similarly to the dial portions 8A and 8B of the first operating portion 5, the dial portions 8A and 8B of the third operating portion 7 are configured so as to interpose the third guide portion 72 therebetween via the movable members 9A and 9B. Moreover, the dial portions 8A and 8B and the third guide portion 72 of the third operating portion 7 are spaced apart from the main body frame 2A as shown in FIG. 1, and arranged to the right of the projector 100 as shown in FIG. 6B.

Although described in detail later, with the rotation of the dial portions 8A and 8B of the third operating portion 7, the third guide portion 72 is released from a state of being interposed between the pair of movable members 9A and 9B. Then, the movement of the third guide portion 72, that is, the pushing or pulling of the third extending portion 431 is made possible, and the third support portion 33 connected to the third extending portion 431 is pushed or pulled at a portion thereof distant from the third central axis 30Ax, thereby rotating about the third central axis 30Ax.

Moreover, as described above, the first central axis 10Ax, the second central axis 20Ax, and the third central axis 30Ax are provided at the positions shifted from the center of gravity G of the projector 100. Then, as shown in FIG. 6A, the first operating portion 5 is provided on the center of gravity G side relative to the first central axis 10Ax, and the second operating portion 6 is provided on the center of gravity G side relative to the second central axis 20Ax. The third operating portion 7 is provided on the center of gravity G side relative to the third central axis 30Ax.

In this manner, the adjusting mechanism 3 couples the main body frame 2A with the projector 100, and individually rotates the first support portion 31, the second support portion 32, and the third support portion 33 with the operations of the first operating portion 5, the second operating portion 6, and the third operating portion 7. Then, for the projector 100 held to the third support portion 33, the adjustments of position in three directions (horizontal rotation adjustment, horizontal roll adjustment, and tilt adjustment) are carried out according to the operation of the adjusting mechanism 3.

Method of Adjusting Projector Supporting Apparatus

Here, a method of adjusting the projector supporting apparatus 1 will be specifically described.

First, a method of carrying out the horizontal rotation adjustment in which the projector 100 supported in the projector supporting apparatus 1 is rotated about the first central axis 10Ax will be described.

Returning to FIG. 6A, in the adjusting mechanism 3 in the first reference state as described above, the second central axis 20Ax forms a substantially right angle with the columnar portion 25F of the adjusting mechanism supporting portion 25. In the first reference state, the frame 33B of the third support portion 33 that holds the projector 100 is substantially parallel to the columnar portion 25B in the projector supporting apparatus 1.

Then, with the operation of the first operating portion 5, the projector 100 rotates about the first central axis 10Ax.

Figure 8A:
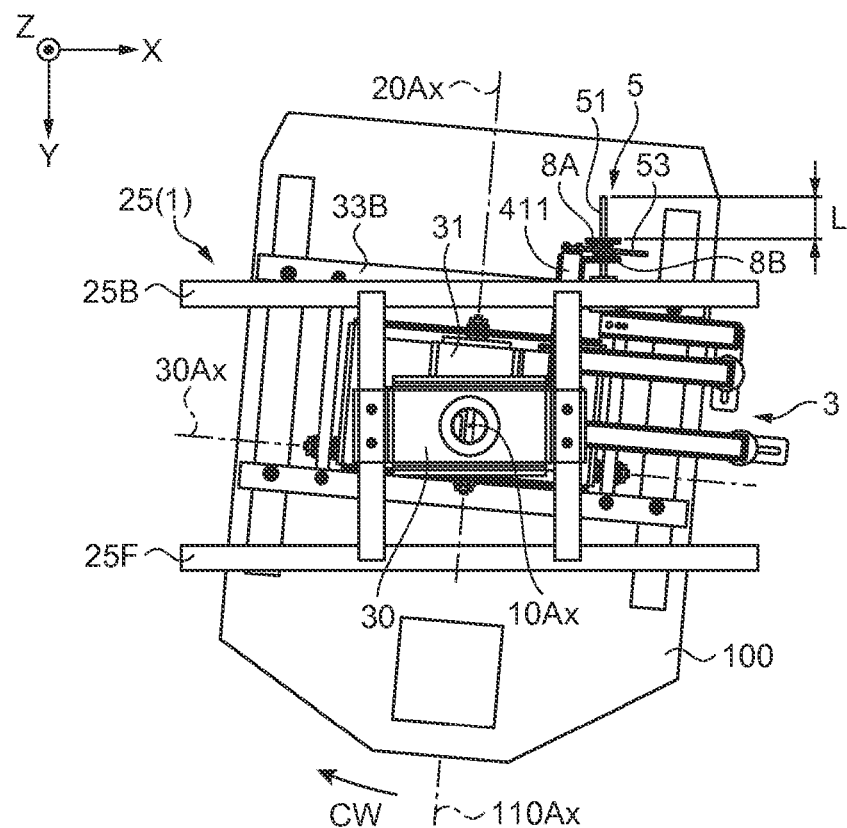
FIG. 8A is a top plan view of the projector, the adjusting mechanism supporting portion, and the adjusting mechanism according to the embodiment when rotated in one direction from the first reference state.
Figure 8B:
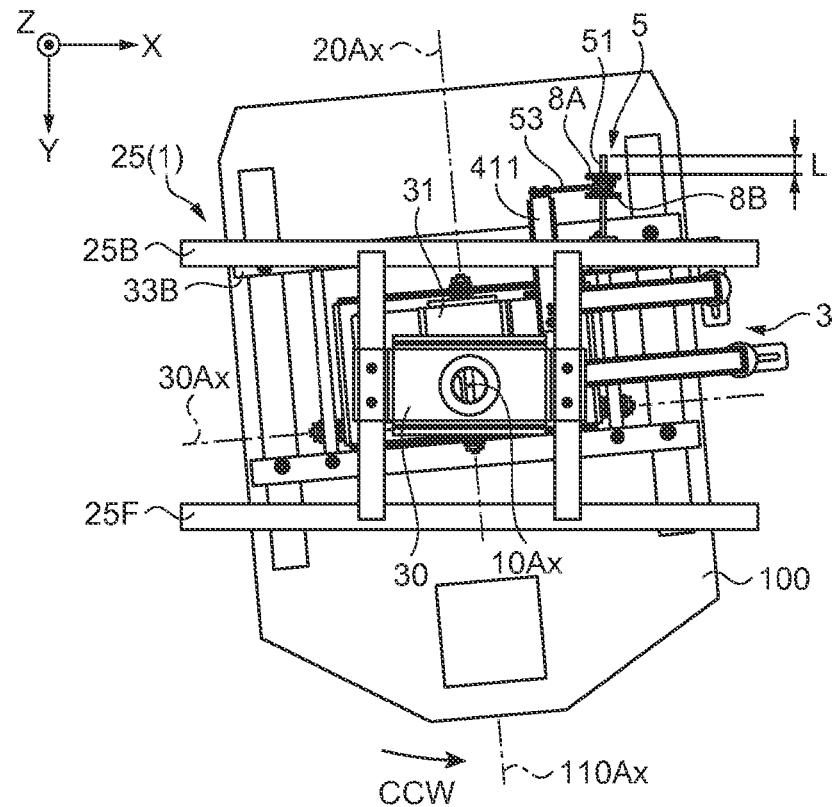
FIG. 8B is a top plan view of the projector, the adjusting mechanism supporting portion, and the adjusting mechanism according to the embodiment when rotated in the opposite direction from the first reference state.

FIGS. 8A and 8B are top plan views of the projector 100 in the horizontal position, and the adjusting mechanism supporting portion 25 and the adjusting mechanism 3 in the projector supporting apparatus 1. Specifically, FIG. 8A shows the case where the projector 100 is rotated in one direction from the first reference state, and FIG. 8B shows the case where the projector 100 is rotated in the opposite direction.

In the projector supporting apparatus 1, when the dial portion 8B of the first operating portion 5 is loosened from the first reference state, the projector 100 can rotate clockwise (a CW direction) as shown in FIG. 8A, while when the dial portion 8A of the first operating portion 5 is loosened from the first reference state, the projector 100 can rotate counterclockwise (a CCW direction) as shown in FIG. 8B.

Specifically, when the dial portion 8B of the first operating portion 5 is loosened from the first reference state, the dial portion 8B separates from the first guide portion 53, and therefore, the user can push the first guide portion 53 (the tip side of the first extending portion 411) forward.

When the first guide portion 53 (the tip side of the first extending portion 411) is pushed forward, the first support portion 31 connected to the first extending portion 411 rotates clockwise (the CW direction) about the first central axis 10Ax relative to the base portion 30 as shown in FIG. 8A. Since the projector 100 is coupled to the first support portion 31 via the third support portion 33 and the second support portion 32, the projector 100 rotates together with the first support portion 31.

The user adjusts the amount of rotation while observing a projected image, and causes the dial portions 8A and 8B to interpose the first guide portion 53 therebetween via the movable members 9A and 9B at the adjusted position. As a result, the projector 100 is inclined in the negative X-direction relative to the first reference state according to the amount of rotation as shown in FIG. 8A, and the adjusted state is maintained. In the first guide shaft 51, an amount of projection L from the dial portion 8A becomes larger than that in the first reference state.

Figure 9:
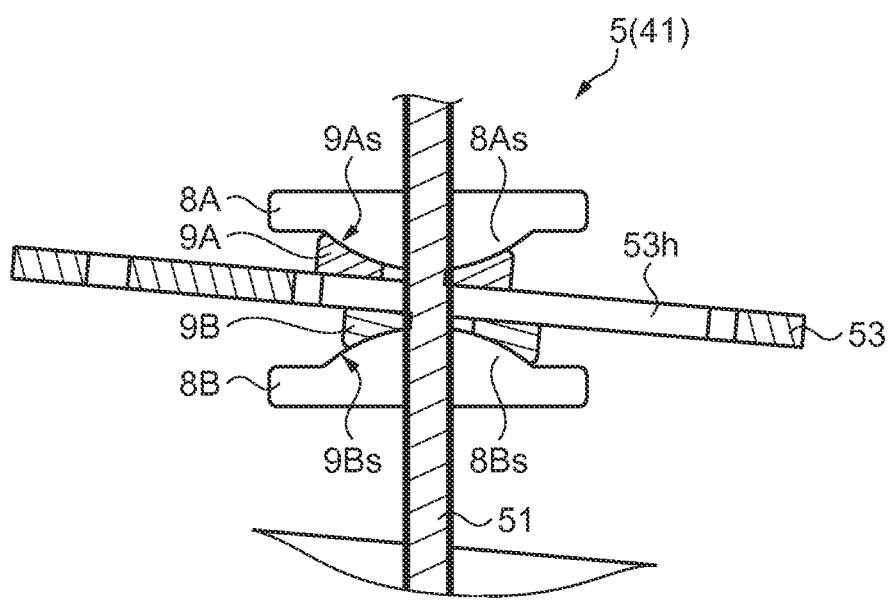
FIG. 9 is an enlarged cross-sectional view showing the vicinity of dial portions in the first operating portion in FIG. 8A.

FIG. 9 is an enlarged cross-sectional view showing the vicinity of the dial portions 8A and 8B in the first operating portion 5 in FIG. 8A.

Since the first guide shaft 51 is fixed to the adjusting mechanism supporting portion 25 via the shaft supporting portion 52 (refer to FIG. 4), the first guide shaft 51 moves relatively in the insertion hole 53h when the first guide portion 53 is moved. Moreover, when the first support portion 31 is rotated from the first reference state, the first guide portion 53 is brought into an inclined state from the state where the first guide portion 53 forms a substantially right angle with the first guide shaft 51 (refer to FIG. 6A).

In the process of rotation of the first support portion 31 from the first reference state, the movable members 9A and 9B slide on the surface of the first guide portion 53 and the surfaces of the spherical surface portions 8As and 8Bs of the dial portions 8A and 8B, and are brought into a state where the movable members 9A and 9B move in different directions from each other as shown in FIG. 9. With the structure including the movable members 9A and 9B as described above, the first support portion 31 rotates smoothly.

On the other hand, when the dial portion 8A is loosened from the first reference state, the dial portion 8A separates from the first guide portion 53, and therefore, the user can pull the first guide portion 53 (the tip side of the first extending portion 411) backward.

When the first guide portion 53 (the tip side of the first extending portion 411) is pulled backward, the first support portion 31 connected to the first extending portion 411 rotates counterclockwise (the CCW direction) about the first central axis 10Ax relative to the base portion 30 as shown in FIG. 8B. The projector 100 rotates together with the first support portion 31.

Similarly to the case where the first support portion 31 is rotated clockwise, the user adjusts the amount of rotation while observing a projected image, and causes the dial portions 8A and 8B to interpose the first guide portion 53 therebetween via the movable members 9A and 9B at the adjusted position. As a result, the projector 100 is inclined in the positive X-direction relative to the first reference state according to the amount of rotation as shown in FIG. 8B, and the adjusted state is maintained. In the first guide shaft 51, the amount of projection L from the dial portion 8A is smaller than that in the first reference state. The movable members 9A and 9B function in the same manner as in the case where the first support portion 31 rotates clockwise.

In this manner, the tip side of the first extending portion 411 is pushed or pulled in the direction intersecting the first central axis 10Ax with the operation of the first operating portion 5, so that the horizontal rotation adjustment of the projector 100 supported in the projector supporting apparatus 1 is carried out.

Next, a method of carrying out the horizontal roll adjustment in which the projector 100 supported in the projector supporting apparatus 1 is rotated about the second central axis 20Ax will be described.

Returning to FIG. 6B, in the adjusting mechanism 3 in the second reference state as described above, the third central axis 30Ax is substantially parallel to the columnar portion 25F.

Then, with the operation of the second operating portion 6, the projector 100 rotates about the second central axis 20Ax.

Figure 10A:
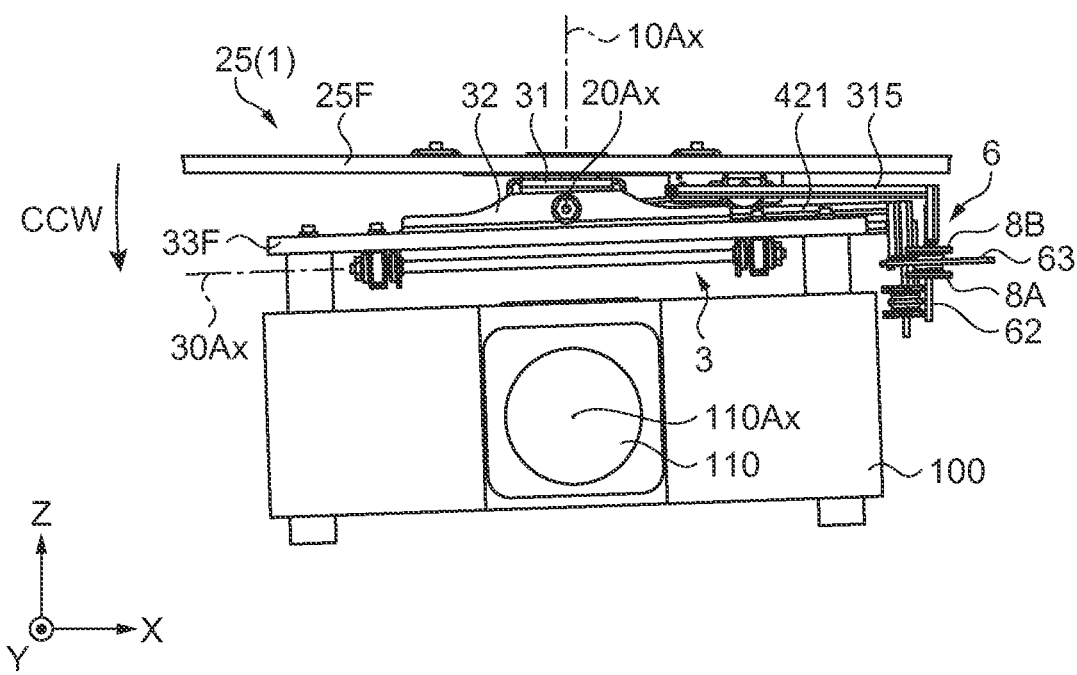
FIG. 10A is a front plan view of the projector, the adjusting mechanism supporting portion, and the adjusting mechanism according to the embodiment when rotated in one direction from a second reference state.
Figure 10B:
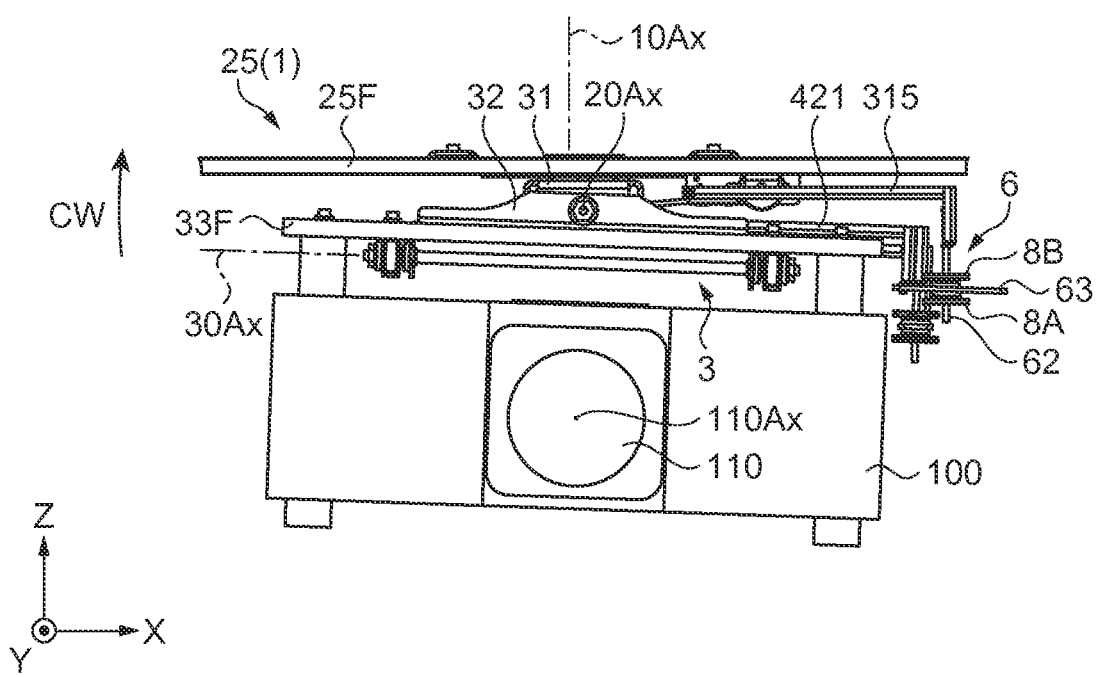
FIG. 10B is a front plan view of the projector, the adjusting mechanism supporting portion, and the adjusting mechanism according to the embodiment when rotated in the opposite direction from the second reference state.

FIGS. 10A and 10B are front plan views of the projector 100 in the horizontal position, and the adjusting mechanism supporting portion 25 and the adjusting mechanism 3 in the projector supporting apparatus 1. Specifically, FIG. 10A shows the case where the projector 100 is rotated in one direction from the second reference state, and FIG. 10B shows the case where the projector 100 is rotated in the opposite direction.

In the projector supporting apparatus 1, when the dial portion 8B of the second operating portion 6 is loosened from the second reference state, the projector 100 can rotate in the CCW direction as shown in FIG. 10A, while when the dial portion 8A of the second operating portion 6 is loosened from the second reference state, the projector 100 can rotate in the CW direction as shown in FIG. 10B.

Specifically, the projector 100 is supported in the projector supporting apparatus 1 with the center of gravity G located on the second operating portion 6 side relative to the second central axis 20Ax. Therefore, when the dial portion 8B of the second operating portion 6 is loosened from the second reference state, the dial portion 8B separates from the second guide portion 63, but the position of the second guide portion 63 relative to the dial portion 8A is maintained. When the dial portion 8A of the second operating portion 6 is loosened from the second reference state, the second guide portion 63 moves following the rotation of the dial portion 8A. After the dial portion 8B is loosened, when the dial portion 8A is rotated to push the second guide portion 63 (the tip side of the second extending portion 421) upward, the second support portion 32 connected to the second extending portion 421 rotates in the CCW direction about the second central axis 20Ax relative to the first support portion 31 as shown in FIG. 10A. Since the projector 100 is coupled to the second support portion 32 via the third support portion 33, the projector 100 rotates together with the second support portion 32.

The user adjusts the amount of rotation while observing a projected image, and tightens the dial portion 8B to thereby cause the dial portions 8A and 8B to interpose the second guide portion 63 therebetween via the movable members 9A and 9B. As a result, the projector 100 is inclined according to the amount of rotation such that the positive X-side of the projector 100 is located higher than the negative X-side as shown in FIG. 10A, and the adjusted state is maintained.

On the other hand, when the dial portion 8A is loosened from the second reference state, the second guide portion 63 (the second extending portion 421) moves following the dial portion 8A, that is, is pulled downward. When the second guide portion 63 (the tip side of the second extending portion 421) is pulled downward, the second support portion 32 connected to the second extending portion 421 rotates in the CW direction about the second central axis 20Ax relative to the first support portion 31 as shown in FIG. 10B.

The user adjusts the amount of rotation while observing a projected image, and tightens the dial portion 8B to thereby cause the dial portions 8A and 8B to interpose the second guide portion 63 therebetween via the movable members 9A and 9B. As a result, the projector 100 is inclined according to the amount of rotation such that the negative X-side of the projector 100 is located higher than the positive X-side as shown in FIG. 10B, and the adjusted state is maintained.

The movable members 9A and 9B in the second operating portion 6 function in the same manner as the movable members 9A and 9B in the first operating portion 5.

In this manner, the tip side of the second extending portion 421 is pushed or pulled in the direction intersecting the second central axis 20Ax with the operation of the second operating portion 6, so that the horizontal roll adjustment of the projector 100 supported in the projector supporting apparatus 1 is carried out.

Next, a method of carrying out the tilt adjustment in which the projector 100 supported in the projector supporting apparatus 1 is rotated about the third central axis 30Ax will be described.

Returning to FIG. 6C, in the adjusting mechanism 3 in the third reference state as described above, the frame 33R of the third support portion 33 is substantially parallel to the columnar portion 25R.

Then, with the operation of the third operating portion 7, the projector 100 rotates about the third central axis 30Ax.

Figure 11A:
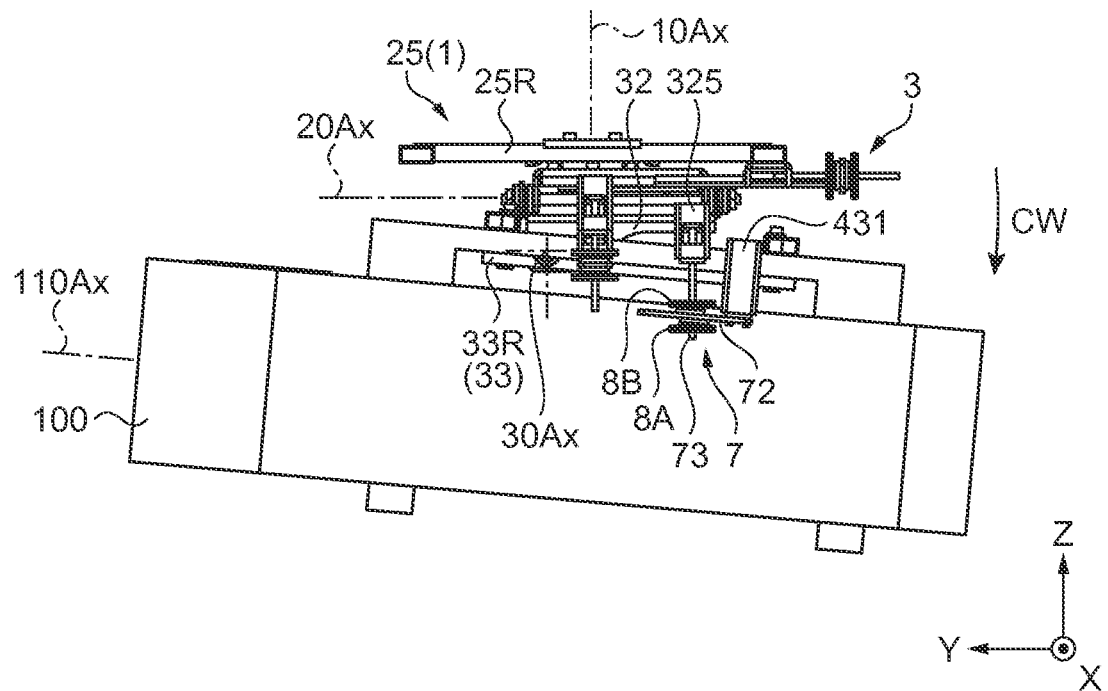
FIG. 11A is a right side plan view of the projector, the adjusting mechanism supporting portion, and the adjusting mechanism according to the embodiment when rotated in one direction from a third reference state.
Figure 11B:
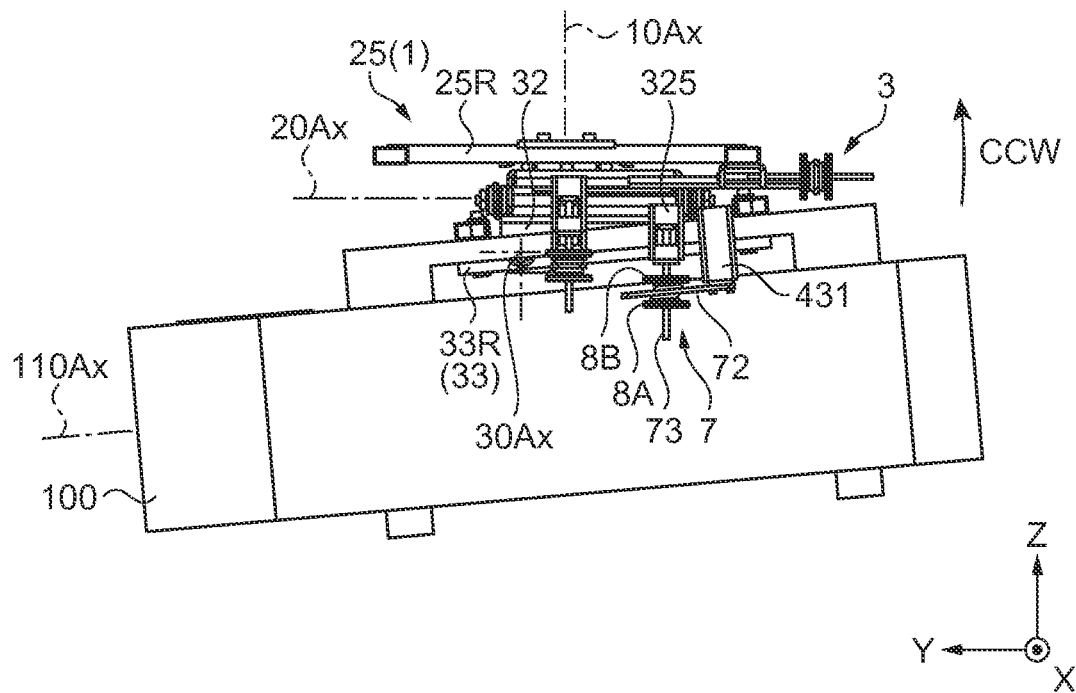
FIG. 11B is a right side plan view of the projector, the adjusting mechanism supporting portion, and the adjusting mechanism according to the embodiment when rotated in the opposite direction from the third reference state.

FIGS. 11A and 11B are right side plan views of the projector 100 in the horizontal position, and the adjusting mechanism supporting portion 25 and the adjusting mechanism 3 in the projector supporting apparatus 1. Specifically, FIG. 11A shows the case where the projector 100 is rotated in one direction from the third reference state, and FIG. 11B shows the case where the projector 100 is rotated in the opposite direction.

In the projector supporting apparatus 1, when the dial portion 8A of the third operating portion 7 is loosened from the third reference state, the projector 100 can rotate in the CW direction as shown in FIG. 11A, while when the dial portion 8B of the third operating portion 7 is loosened from the third reference state, the projector 100 can rotate in the CCW direction as shown in FIG. 11B.

Specifically, the projector 100 is supported in the projector supporting apparatus 1 with the center of gravity G located on the third operating portion 7 side relative to the third central axis 30Ax. Therefore, when the dial portion 8A of the third operating portion 7 is loosened from the third reference state, the third guide portion 72 (the tip side of the third extending portion 431) moves following the dial portion 8A, that is, is pulled downward. The third support portion 33 connected to the third extending portion 431 rotates in the CW direction about the third central axis 30Ax relative to the second support portion 32 as shown in FIG. 11A. The projector 100 held to the third support portion 33 rotates together with the third support portion 33.

The user adjusts the amount of rotation while observing a projected image, and tightens the dial portion 8B to thereby cause the dial portions 8A and 8B to interpose the third guide portion 72 therebetween via the movable members 9A and 9B. As a result, the projector 100 is inclined according to the amount of rotation such that the positive Y-side of the projector 100 is located higher than the negative Y-side as shown in FIG. 11A, and the adjusted state is maintained.

On the other hand, when the dial portion 8B is loosened from the third reference state, the dial portion 8B separates from the third guide portion 72, and therefore, the user can push the third guide portion 72 (the tip side of the third extending portion 431) upward.

When the third guide portion 72 (the tip side of the third extending portion 431) is pushed upward, the third support portion 33 connected to the third extending portion 431 rotates in the CCW direction about the third central axis 30Ax relative to the second support portion 32 as shown in FIG. 11B. The projector 100 rotates together with the third support portion 33.

The user adjusts the amount of rotation while observing a projected image, and tightens the dial portion 8A at the adjusted position to thereby cause the dial portions 8A and 8B to interpose the third guide portion 72 therebetween via the movable members 9A and 9B. As a result, the projector 100 is inclined according to the amount of rotation such that the negative Y-side of the projector 100 is located higher than the positive Y-side as shown in FIG. 11B, and the adjusted state is maintained.

The movable members 9A and 9B in the third operating portion 7 function in the same manner as the movable members 9A and 9B in the first operating portion 5.

In this manner, the tip side of the third extending portion 431 is pushed or pulled in the direction intersecting the third central axis 30Ax with the operation of the third operating portion 7, so that the tilt adjustment of the projector 100 supported in the projector supporting apparatus 1 is carried out.

Moreover, the adjusting mechanism 3 is configured such that the rotation range of the second support portion 32 is smaller than the rotation ranges of the first support portion 31 and the third support portion 33. That is, the adjusting mechanism 3 is configured such that the range of horizontal roll adjustment of the projector 100 is smaller than the ranges of horizontal rotation adjustment and tilt adjustment.

Configuration of Coupling Portion

Next, the coupling portion 23 will be described in detail.

FIGS. 12A to 12C are cross-sectional views showing the vicinity of the coupling portion 23 of the main body frame 2A, focusing one coupling portion 23 of the four coupling portions 23. Specifically, FIG. 12A shows a state where the first frame 21 and the second frame 22 are separated from each other, FIG. 12B shows a state where the first frame 21 is placed on the second frame 22, and FIG. 12C shows a state where the first frame 21 and the second frame 22 are coupled together.

As shown in FIG. 12A, the coupling portion 23 includes a movable member 231 as an engaging portion, a guide portion 232, a locking portion 233, a fixing screw 234, and a fixed member 235 as an engaged portion. The movable member 231, the guide portion 232, the locking portion 233, and the fixing screw 234 are provided at the tip portion of the first connecting portion 212, while the fixed member 235 is provided at the tip portion of the second connecting portion 222.

The guide portion 232 is attached to the tip portion of the first connecting portion 212 by swaging or the like. As shown in FIG. 12A, the guide portion 232 includes an insertion portion 2321 inserted into the first connecting portion 212 and a cylinder portion 2322 whose outside diameter is smaller than the outside diameter of the insertion portion 2321. The cylinder portion 2322 projects from the first connecting portion 212. A screw hole is formed in the center of the guide portion 232.

The movable member 231 is formed in a cylindrical shape with one side opened, has a screw groove 231M formed on the inner surface thereof, and has a round hole formed on the other side and having a diameter smaller than the inside diameter of the inner surface. The round hole is a hole through which the cylinder portion 2322 of the guide portion 232 is inserted. An annular protruded portion 2311 is provided around the round hole on the other side of the movable member 231.

The locking portion 233 has an outside diameter larger than the outside diameter of the cylinder portion 2322 of the guide portion 232 and smaller than the inside diameter of the movable member 231, and is formed in a plate shape. An insertion hole through which the fixing screw 234 is inserted is formed in the center of the locking portion 233.

After the cylinder portion 2322 of the guide portion 232 is inserted through the round hole of the movable member 231, the fixing screw 234 is inserted through the insertion hole, and then, the locking portion 233 is fixed to the tip of the guide portion 232. With the movement of the movable member 231 toward the second frame 22 side in the first direction (the up-and-down direction) along the extending direction of the first connecting portion 212, the locking portion 233 locks the movable member 231 at a predetermined position.

The upward movement of the movable member 231 is regulated due to the protruded portion 2311 abutting on the insertion portion 2321, while the downward movement is regulated due to the protruded portion 2311 abutting on the locking portion 233. That is, the movable member 231 is guided by the cylinder portion 2322 between the insertion portion 2321 and the locking portion 233, and can move along the first direction (the up-and-down direction). Moreover, the movable member 231 is arranged in a loosely fitted state relative to the locking portion 233 in the directions (front and back, and left and right) intersecting the first direction (the up-and-down direction).

In the embodiment, a washer is used as the locking portion 233, and a hexagon socket head cap screw is used as the fixing screw 234. The locking portion 233 may be composed of a member other than a washer. Moreover, the method of fixing the locking portion 233 to the tip of the guide portion 232 is not limited to the screw fixing, and a swaging process, a heat welding process, or the like may be sued.

The fixed member 235 is attached to the tip portion of the second connecting portion 222 by swaging or the like. A portion of the fixed member 235 is inserted into the second connecting portion 222, and a portion of the fixed member 235 projects from the second connecting portion 222.

A screw groove 235M is formed on the outer circumferential surface of the portion of the fixed member 235 projecting from the second connecting portion 222, and a recess 235a is formed in the center of the portion.

The screw groove 235M is formed so as to screw with the screw groove 231M of the movable member 231. The recess 235a is formed to have a size allowing the head of the fixing screw 234 to be inserted thereinto. The head of the fixing screw 234 corresponds to a projecting portion that projects toward the second frame 22.

Moreover, the outer circumferential edge of the portion of the fixed member 235 projecting from the second connecting portion 222 is chamfered.

Here, a method of coupling the first frame 21 with the second frame 22 will be described.

First, the projector 100 is supported to the first frame 21 via the adjusting mechanism 3.

The first frame 21 that supports the projector 100 via the adjusting mechanism 3 is coupled to the second frame 22 placed on a floor or the like.

Specifically, the user places the first frame 21 on the second frame 22, in a state where the second frame 22 is placed on a floor or the like, so as to insert the head of the fixing screw 234 into the recess 235a (refer to FIG. 12B). Since the movable member 231 is arranged in a loosely fitted state relative to the locking portion 233, the movable member 231 is arranged such that the tip portion of the screw groove 231M is located at the tip of the screw groove 235M of the fixed member 235 when the head of the fixing screw 234 is inserted into the recess 235a.

Moreover, as shown in FIG. 12B, in the state where the first frame 21 is placed on the second frame 22, the lower surface of the locking portion 233 abuts on the upper surface of the fixed member 235. That is, the member (the locking portion 233) arranged on the first connecting portion 212 comes into surface contact with the member (the fixed member 235) arranged on the second connecting portion 222, whereby the position of the first frame 21 in the first direction is determined relative to the second frame 22.

Next, when the movable member 231 is rotated, the screw groove 231M and the screw groove 235M are screwed together. When the movable member 231 is rotated until the protruded portion 2311 abuts on the locking portion 233, the first frame 21 and the second frame 22 are brought into a state of being coupled together as shown in FIG. 12C.

On the other hand, when the movable member 231 is loosened and the screwing of the screw groove 231M and the screw groove 235M is released, the first frame 21 and the second frame 22 can be separated from each other.

In this manner, the coupling portion 23 separably couples the first frame 21 with the second frame 22.

Next, the position of the coupling portion 23 in the up-and-down direction will be described.

Returning to FIG. 2, the projector supporting apparatus 1 is formed such that in the state where the second frame 22 is separated, the first frame 21 and the members arranged on the first frame 21 side are located higher than the lower end of the projector 100, that is, the lower end of the leg portion 12F.

Specifically, the position of the coupling portion in the up-and-down direction will be described with reference to FIG. 13.

Figure 13:
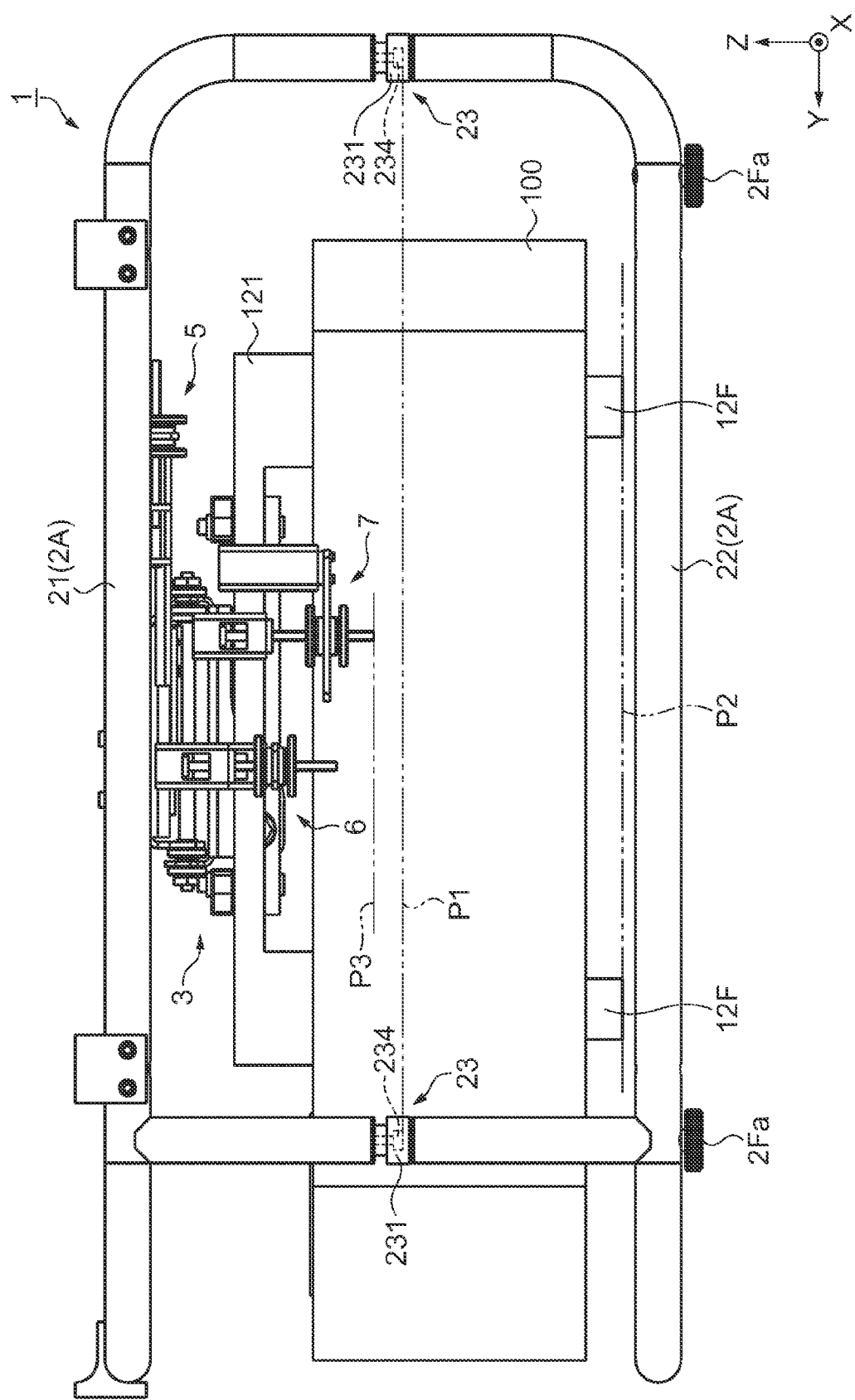
FIG. 13 is a side view showing the projector supporting apparatus and the projector supported in the projector supporting apparatus according to the embodiment.

FIG. 13 is a side view showing the projector supporting apparatus 1 and the projector 100 supported in the projector supporting apparatus 1.

As described above, the movable member 231, the guide portion 232, the locking portion 233, and the fixing screw 234 are arranged on the first frame 21 side (refer to FIG. 12A).

In the projector supporting apparatus 1, in the state where the second frame 22 is separated, a member located lowermost among the first frame 21 and the members arranged in the first frame 21 is the movable member 231 as shown in FIGS. 2 and 12A.

The movable member 231 is configured to be movable in the up-and-down direction, and the lower end thereof is configured to be able to be located above the lower end of the fixing screw 234 as shown in FIG. 12B. Therefore, the fixing screw 234 is a member substantially located lowermost. Moreover, the movable member 231 and the fixing screw 234 that are arranged on each of the four first connecting portions 212 are formed substantially at the same position in the up-and-down direction. Then, as shown in FIG. 13, a position P1 of the lower end of the fixing screw 234 is located higher than a position P2 of the lower end of the leg portion 12F.

In this manner, the projector supporting apparatus 1 is formed such that in the state where the second frame 22 is separated, the first frame 21 and the members arranged in the first frame 21 are located higher than the lower end of the projector 100.

As shown in FIG. 13, the adjusting mechanism 3 is configured such that the third operating portion 7 is located lowermost. A position P3 of the lower end of the third operating portion 7 is located higher than the position P1 of the lower end of the fixing screw 234, that is, higher than the position of the lower ends of the first frame 21 and the members arranged in the first frame 21.

As has been described above, according to the projector supporting apparatus 1 of the embodiment, the following advantageous effects can be obtained.

(1) The inclining position of the projector 100 is changed according to a direction in which each of the support portions (the first support portion 31, the second support portion 32, and the third support portion 33) is rotated. With this configuration, since the inclination of the projector 100 in three directions can be independently adjusted, it is possible to provide the projector supporting apparatus 1 capable of easily adjusting distortion of the image projected on the projection surface.

Moreover, the adjusting mechanism 3 includes the first extending portion 411, the second extending portion 421, and the third extending portion 431, and the first operating portion 5, the second operating portion 6, and the third operating portion 7 are provided on the respective tip sides of the first extending portion 411, the second extending portion 421, and the third extending portion 431. Therefore, even when the projector 100 has a large size, work for the position adjustment of the projector 100 can be easily carried out from the vicinity of the outer periphery of the projector 100.

Moreover, even when the space between the upper frame 211 and the projector 100 is narrowed so that the user cannot put a hand therebetween, the operations of the first operating portion 5, the second operating portion 6, and the third operating portion 7 are possible. Therefore, it is possible to provide the projector supporting apparatus 1 whose size in its thickness direction (the up-and-down direction) is suppressed and which allows stack arrangement.

(2) When the center of gravity of the projector 100 is located on the central axis about which the projector 100 rotates, the balance of the projector 100 is unstable as in a seesaw fashion in adjusting the position. Therefore, it is conceivable that the operation of the position adjustment is difficult. In a configuration with the central axis along a horizontal plane, the balance is further unstable.

In the projector supporting apparatus 1 of the embodiment, since the first central axis 10Ax, the second central axis 20Ax, and the third central axis 30Ax are provided at the positions shifted from the center of gravity G of the projector 100, the position of the projector 100 can be adjusted in a stable state.

(3) The adjusting mechanism 3 is configured such that the first support portion 31, the second support portion 32, and the third support portion 33 are arranged in this order from the adjusting mechanism supporting portion 25 side, and that the rotation range of the second support portion 32 is smaller than the rotation ranges of the first support portion 31 and the third support portion 33. With this configuration, since the rotation range of the second support portion 32 located between the first support portion 31 and the third support portion 33 is made small, the size of the adjusting mechanism can be reduced. Therefore, the rotation ranges in the horizontal rotation adjustment and the tilt adjustment whose frequencies of use are conceivably high are configured to be larger than the rotation range in the horizontal roll adjustment, so that it is possible to provide the projector supporting apparatus 1 including the adjusting mechanism whose size can be reduced.

(4) The first operating portion 5 is arranged in the first direction (negative Y-direction) orthogonal to the first central axis 10Ax, and the second operating portion 6 and the third operating portion 7 are arranged in the second direction (positive X-direction) orthogonal to the first central axis 10Ax. With this configuration, the user can adjust the position of the projector 100 in three directions by operating the projector supporting apparatus 1 from two directions. Therefore, work for the position adjustment of the projector 100 in three directions can be simplified.

Moreover, the first operating portion 5 is arranged on the back side of the projector supporting apparatus 1, and the second operating portion 6 and the third operating portion 7 are arranged on the side opposite to the second leg portion 2Fb. Therefore, even when the projector supporting apparatus 1 is installed in the vertical position, it is possible to easily operate the first operating portion 5, the second operating portion 6, and the third operating portion 7.

(5) Since at least a portion of the second support portion 32 is arranged in the opening 33A of the third support portion 33, the adjusting mechanism 3 can be made thinner.

Moreover, since the third support portion 33 is composed of the tubular frames each having a rectangular cross-section, the third support portion 33 can be a strengthened member even with the provision of the opening. This enables the adjusting mechanism 3 to suppress an increase in thickness and reliably hold the projector 100 even when it is heavy.

(6) With simple operations of pushing or pulling the first guide portion 53, the second guide portion 63, and the third guide portion 72 by rotating the dial portions 8A and 8B provided in the first operating portion 5, the second operating portion 6, and the third operating portion 7, the inclination of the projector 100 in three directions can be easily adjusted.

Moreover, since the dial portions 8A and 8B in the first operating portion 5, the second operating portion 6, and the third operating portion 7 and the respective guide portions (the first guide portion 53, the second guide portion 63, and the third guide portion 72) thereof are provided at the positions spaced apart from the main body frame 2A, the user can easily grip these members and easily carry out adjustment work.

(7) Each of the first operating portion 5, the second operating portion 6, and the third operating portion 7 includes the movable members 9A and 9B, and the dial portions 8A and 8B and the movable members 9A and 9B are configured to be slidable on the spherical surfaces. Therefore, even when the first support portion 31, the second support portion 32, and the third support portion 33 are rotated, it is possible to suppress torsional stress applied to the dial portions 8A and 8B or the first guide portion 53, the second guide portion 63, and the third guide portion 72. Therefore, it is possible to suppress the deterioration of the adjusting mechanism 3 and smoothly rotate the first support portion 31, the second support portion 32, and the third support portion 33.

(8) After attaching the projector 100 to the first frame 21 via the adjusting mechanism 3, the first frame 21 can be coupled to the second frame 22. Therefore, when the projector 100 is supported in the projector supporting apparatus 1, the projector 100 can be easily arranged at a predetermined position in the projector supporting apparatus 1 without turning the projector 100 upside down, or without carefully arranging the projector 100 in the projector supporting apparatus 1 so as not to damage the projector 100. Similarly, also when the projector 100 supported in the projector supporting apparatus 1 is taken therefrom, the first frame 21 and the second frame 22 can be separated from each other without turning the projector 100 upside down, and the projector 100 can be easily taken from the projector supporting apparatus 1.

Moreover, compared to a projector supporting apparatus that is configured so as not to be separable, the space between the projector 100 and the projector supporting apparatus 1 can be made small, and therefore, the size of the projector supporting apparatus 1 can be reduced.

Moreover, since the projector supporting apparatus 1 can be separated into the upper and lower portions, compact storage is possible when the projector supporting apparatus 1 is packaged for transportation or the like. Therefore, compared to a projector supporting apparatus that is configured so as not to be separable, more projector supporting apparatuses 1 can be stored in a loadable area such as of a truck, and therefore, transport efficiency is improved.

(9) The projector supporting apparatus 1 is formed such that in the state where the second frame 22 is separated, the first frame 21 and the members arranged in the first frame 21 are located higher than the lower end of the projector 100. With this configuration, in the state where the projector 100 is placed on a floor or the like, the adjusting mechanism 3 or the first frame 21 can be attached or detached without lifting the projector 100. Therefore, the attachment or detachment of the projector 100 relative to the projector supporting apparatus 1 is facilitated.

(10) The first frame 21 and the second frame 22 can be coupled together by engaging the movable member 231 (engaging portion) with the fixed member 235 (engaged portion), while the first frame 21 and the second frame 22 can be separated from each other by releasing the engagement. Therefore, the coupling or separation of the first frame 21 and the second frame 22 can be easily carried out.

(11) When the first frame 21 and the second frame 22 are coupled together, the weight of the first frame 21, the adjusting mechanism 3, and the projector 100 is applied to contact portions. Since the projector supporting apparatus 1 of the embodiment is configured such that the contact portions come into surface contact with each other, the weight of the first frame 21, the adjusting mechanism 3, and the projector 100 can be supported by surfaces. Therefore, it is possible to provide the projector supporting apparatus 1 capable of stably supporting the projector 100 over a long period.

(12) The coupling and separation of the first frame 21 and the second frame 22 are carried out by screwing the screw groove 231M with the screw groove 235M of the fixed member 235 and releasing the screwing with the rotation of the movable member 231. This configuration enables the projector supporting apparatus 1 to easily carry out the coupling and separation of the first frame 21 and the second frame 22 without providing a projecting portion such as a lever for carrying out the coupling and separation of the first frame 21 and the second frame 22. Moreover, since the main body frame 2A can be configured without a projecting portion such as a lever, it is possible to improve the handling property of the projector supporting apparatus 1 or make the projector supporting apparatus 1 look more attractive.

(13) Since the movable member 231 is arranged in the loosely fitted state relative to the locking portion 233, the screw groove 231M of the movable member 231 can be screwed with the screw groove 235M of the fixed member 235 even when the movable member 231 and the fixed member 235 are not accurately fitted together. Therefore, the first frame 21 and the second frame 22 can be easily coupled together.

(14) When the first frame 21 and the second frame 22 are coupled together, the first frame 21 and the second frame can be aligned with each other by inserting the head (projecting portion) of the fixing screw 234 into the recess 235a. Therefore, the first frame 21 and the second frame 22 can be easily coupled together.

(15) The position P3 of the lower end of the adjusting mechanism 3 is located higher than the position P1 of the lower end of the fixing screw 234. With this configuration, even when the first frame 21 to which the adjusting mechanism 3 is supported is placed on a floor or the like, the adjusting mechanism 3 does not contact the floor or the like. Therefore, assembly work, installation work, or the like for the projector supporting apparatus 1 can be carried out without applying a load to the adjusting mechanism 3.

(16) Since the projector supporting apparatus 1 includes the joining portions for stacking 2S, a plurality of projectors 100 can be easily arranged in a stacked manner.

MODIFIED EXAMPLE

The embodiment may be modified as follows.

The respective operating portions (the first operating portion 5, the second operating portion 6, and the third operating portion 7) of the embodiment are provided on the center of gravity G side relative to the respective central axes (the first central axis 10Ax, the second central axis 20Ax, and the third central axis 30Ax). However, the respective operating portions may be arranged at other positions as long as the first central axis 10Ax, the second central axis 20Ax, and the third central axis 30Ax are located at positions shifted from the center of gravity G of the projector 100.

The respective operating portions (the first operating portion 5, the second operating portion 6, and the third operating portion 7) of the embodiment are configured so as to interpose the first guide portion 53, the second guide portion 63, and the third guide portion 72 between the respective pairs of dial portions 8A and 8B. However, the operating portion may be configured so as to interpose the guide portion between a biasing portion such as a coil spring and a dial portion.

The dial portions 8A and 8B and the movable members 9A and 9B of the embodiment are configured such that the dial portions 8A and 8B include the convex spherical surface portions 8As and 8Bs, and that the movable members 9A and 9B include the concave engaging portions 9As and 9Bs. However, the concave spherical surface portions may be provided on the dial portions 8A and 8B, and the convex engaging portions may be provided on the movable members 9A and 9B.

The movable members 9A and 9B may be formed of an elastic member.

In the coupling portion 23 of the embodiment, the movable member 231, the guide portion 232, the locking portion 233, and the fixing screw 234 are provided at the tip portion of the first connecting portion 212, while the fixed member 235 is provided at the tip portion of the second connecting portion 222. However, the movable member 231, the guide portion 232, the locking portion 233, and the fixing screw 234 may be provided at the tip portion of the second connecting portion 222, while the fixed member 235 may be provided at the tip portion of the first connecting portion 212. In the case of this configuration, the fixed member 235 corresponds to the engaging portion, and the movable member 231 corresponds to the engaged portion.

Although the first frame 21 in the embodiment is configured such that the position thereof in the first direction relative to the second frame 22 is determined due to the locking portion 233 and the fixed member 235 coming into surface contact with each other, the first frame 21 is not limited to this configuration. That is, the first frame 21 may have any configuration as long as the position of the first frame 21 in the first direction relative to the second frame 22 is determined due to the first connecting portion 212 or the member arranged on the first connecting portion 212 and the second connecting portion 222 or the member arranged on the second connecting portion 222 coming into surface contact with each other.

In the embodiment, the projecting portion (the head of the fixing screw 234) that projects toward the second frame 22 is provided on the first frame 21 side, and the recess 235a into which the projecting portion is inserted is provided on the second frame 22 side. However, the projecting portion that projects toward the first frame 21 may be provided on the second frame 22 side, and the recess into which the projecting portion is inserted may be provided on the first frame 21 side.

In the embodiment, the first frame 21 and the second frame 22 are configured so as to be coupled together with the screwing of the screw groove 231M and the screw groove 235M. However, the first frame 21 and the second frame 22 may be configured so as to be coupled together or separated from each other with any configuration other than the screwing of screw grooves. For example, the first frame 21 and the second frame 22 may be configured such that a coupling portion includes a biasing portion, a hooking portion, a recess, and an operating portion, that the hooking portion biased by the biasing portion engages with the recess, and that the engagement is released by operation of the operating portion.

CROSS REFERENCE TO RELATED APPLICATIONS

This application claims priority to Japanese Patent Application No. 2014-004897 filed on Jan. 15, 2014 and No. 2014-004898 filed on Jan. 15, 2014, the entire contents of which are incorporated by reference herein.

What is claimed is:

1. A projector supporting apparatus that supports a projector including a projection optical system, comprising:
   a main body frame in the interior of which the projector can be arranged; and
   an adjusting mechanism that couples the main body frame with the projector and adjusts the position of the projector, wherein
   the main body frame includes an adjusting mechanism supporting portion that supports the adjusting mechanism,
   the adjusting mechanism includes
      a base portion fixed to the adjusting mechanism supporting portion,
      a first support portion supported to the base portion and rotatable about a first central axis,
      a second support portion supported to the first support portion and rotatable about a second central axis extending in a direction orthogonal to the first central axis,
      a third support portion holding the projector, supported to the second support portion, and rotatable about a third central axis extending in a direction orthogonal to the first central axis and the second central axis, and
      an adjusting portion individually rotating the first support portion, the second support portion, and the third support portion, and
   the adjusting portion includes
      a first extending portion extending from the first support portion in a direction intersecting the first central axis,
      a second extending portion extending from the second support portion in a direction intersecting the first central axis,
      a third extending portion extending from the third support portion in a direction intersecting the first central axis,
      a first operating portion capable of pushing and pulling the tip side of the first extending portion in a direction intersecting the first central axis,
      a second operating portion capable of pushing and pulling the tip side of the second extending portion in a direction intersecting the second central axis, and
      a third operating portion capable of pushing and pulling the tip side of the third extending portion in a direction intersecting the third central axis.

2. The projector supporting apparatus according to claim 1, wherein
   the first central axis, the second central axis, and the third central axis are provided at positions shifted from a center of gravity of the projector.

3. The projector supporting apparatus according to claim 1, wherein
   in a position in which the projector supporting apparatus is installed, the first central axis extends in a direction along the vertical direction, the second central axis extends in a direction along an optical axis of the projection optical system, and the third central axis extends in a direction orthogonal to a vertical plane passing through the optical axis of the projection optical system.

4. The projector supporting apparatus according to claim 1, wherein
   the first extending portion extends in a first direction intersecting the first central axis, and
   the second extending portion and the third extending portion extend in a second direction intersecting the first central axis and the first direction.

5. The projector supporting apparatus according to claim 1, wherein
   the third support portion includes an opening in which at least a portion of the second support portion is arranged.

6. The projector supporting apparatus according to claim 5, wherein
   the third support portion includes a frame forming the opening, and
   the frame is a tubular member having a rectangular cross-section.

7. The projector supporting apparatus according to claim 1, wherein
   the first operating portion includes
      a first guide shaft fixed to the adjusting mechanism supporting portion, extending in a direction intersecting the first central axis, and including a screw groove,
      a first guide portion fixed on the tip side of the first extending portion and including an insertion hole through which the first guide shaft is inserted, and
      a pair of dial portions screwed with the first guide shaft and interposing the first guide portion therebetween,
   the second operating portion includes
      a second guide shaft fixed to the first support portion, extending in a direction intersecting the second central axis, and including a screw groove,
      a second guide portion fixed on the tip side of the second extending portion and including an insertion hole through which the second guide shaft is inserted, and
      a pair of dial portions screwed with the second guide shaft and interposing the second guide portion therebetween, and
   the third operating portion includes
      a third guide shaft fixed to the second support portion, extending in a direction intersecting the third central axis, and including a screw groove,
      a third guide portion fixed on the tip side of the third extending portion and including an insertion hole through which the third guide shaft is inserted, and
      a pair of dial portions screwed with the third guide shaft and interposing the third guide portion therebetween.

8. The projector supporting apparatus according to claim 7, wherein
   the pair of dial portions in each of the first operating portion, the second operating portion, and the third operating portion include spherical surface portions provided on the sides facing each other and each forming a portion of a spherical surface,
   each of the first operating portion, the second operating portion, and the third operating portion includes a pair of movable members each provided with an engaging portion slidably engaging with the spherical surface portion, and the respective pairs of dial portions in the first operating portion, the second operating portion, and the third operating portion interpose the first guide portion, the second guide portion, and the third guide portion therebetween via the respective pairs of movable members.

9. A projector supporting apparatus that supports a projector, comprising:

a main body frame in the interior of which the projector can be arranged; and an adjusting mechanism that couples the main body frame with the projector from above of the projector and adjusts the position of the projector, wherein the main body frame includes a first frame arranged on the upper side of the projector and supporting the adjusting mechanism, a second frame arranged on the lower side of the projector, and a coupling portion separably coupling the first frame with the second frame.

10. The projector supporting apparatus according to claim 9, wherein in a state where the projector is supported and the second frame is separated, the first frame and a member arranged in the first frame are located higher than the lower end of the projector.

11. The projector supporting apparatus according to claim 9, wherein the first frame includes a first connecting portion extending toward the second frame, the second frame includes a second connecting portion extending toward the first connecting portion, and the coupling portion includes an engaging portion provided at the tip portion of the first connecting portion, and an engaged portion provided at the tip portion of the second connecting portion and engaged with the engaging portion.

12. The projector supporting apparatus according to claim 11, wherein the first connecting portion or a member arranged on the first connecting portion comes into surface contact with the second connecting portion or a member arranged on the second connecting portion, whereby the position of the first frame in a first direction along the extending direction of the first connecting portion is determined relative to the second frame.

13. The projector supporting apparatus according to claim 11, wherein any one of the engaging portion and the engaged portion is a movable member including a screw groove on the inner surface thereof and movable in a predetermined range in a first direction along the extending direction of the first connecting portion, and the other of the engaging portion and the engaged portion is a fixed member including, on the outer surface thereof, a screw groove screwable with the screw groove of the movable member.

14. The projector supporting apparatus according to claim 13, further comprising a locking portion that locks the movable member at a predetermined position with movement of the movable member toward the side of the other in the first direction, wherein the movable member is arranged in a loosely fitted state relative to the locking portion in a direction intersecting the first direction.

15. The projector supporting apparatus according to claim 9, wherein any one of the first frame or a member arranged in the first frame and the second frame or a member arranged in the second frame includes a projecting portion projecting toward the other, and the other includes a recess into which the projecting portion is inserted when the first frame and the second frame are coupled together.

16. The projector supporting apparatus according to claim 9, wherein the adjusting mechanism is located higher than the lower ends of the first frame and a member arranged in the first frame.

* * * * *